(12) United States Patent
Heidari-Bateni et al.

(10) Patent No.: US 7,912,081 B2
(45) Date of Patent: Mar. 22, 2011

(54) DEFRAGMENTATION OF COMMUNICATION CHANNEL ALLOCATIONS

(75) Inventors: Ghobad Heidari-Bateni, San Diego, CA (US); Stanislaw Czaja, Cardiff, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 1055 days.

(21) Appl. No.: 11/388,889

(22) Filed: Mar. 23, 2006

(65) Prior Publication Data

US 2006/0264177 A1  Nov. 23, 2006

Related U.S. Application Data

(60) Provisional application No. 60/715,220, filed on Sep. 7, 2005, provisional application No. 60/675,296, filed on Apr. 26, 2005, provisional application No. 60/674,806, filed on Apr. 25, 2005, provisional application No. 60/673,836, filed on Apr. 22, 2005.

(51) Int. Cl.
*H04B 7/212* (2006.01)

(52) U.S. Cl. ........ 370/443; 370/322; 370/348; 370/458; 370/459; 455/450; 455/452.1; 455/452.2

(58) Field of Classification Search .......... 455/450, 455/452.1, 452.2, 453, 464, 509, 41.2, 62, 455/447, 450.451, 502, 512, 515–517; 370/229, 370/232, 252, 253, 468, 310, 321, 322, 328–330, 370/336–338, 345, 347, 348, 376, 395.21, 370/431, 442, 443, 458, 459, 508; 709/223, 709/226, 229; 725/95, 96

See application file for complete search history.

(56) References Cited

U.S. PATENT DOCUMENTS

| | | | | |
|---|---|---|---|---|
| 5,519,689 A | * | 5/1996 | Kim | 370/232 |
| 5,687,167 A | * | 11/1997 | Bertin et al. | 370/254 |
| 5,960,002 A | * | 9/1999 | Ramfelt et al. | 370/450 |
| 6,002,708 A | | 12/1999 | Fleming et al. | |
| 6,097,958 A | | 8/2000 | Bergen | |
| 6,327,254 B1 | * | 12/2001 | Chuah | 370/328 |

(Continued)

FOREIGN PATENT DOCUMENTS

EP  1367783 A1  12/2003

(Continued)

OTHER PUBLICATIONS

Aiello et al., "Time to Market Pervasiveness—Multiband OFDM Products," MBOA Multiband OFDM Alliance SIG, Sep. 13, 2004, available at http://www.wimedia.org/en/resources/mboa_archives.asp.

(Continued)

*Primary Examiner* — Anthony S. Addy
(74) *Attorney, Agent, or Firm* — Sheppard Mullin Richter & Hampton LLP

(57) ABSTRACT

Approaches scheduling and allocation of communication bandwidth across a communication channel provide the opportunity for improved network utilization. A network device is configured to allocating its bandwidth utilization within a communication network, wherein bandwidth allocation is governed by a utilization policy. The network device conducts communication activities within the communication network. When the network device deviates from the utilization policy in scheduling or conducting network activities, a penalty can be imposed on the network device for deviating from the utilization policy. Where one or more network conditions exceed predetermined tolerance levels, the offending network device can be required to reallocate its scheduled activities.

30 Claims, 16 Drawing Sheets

U.S. PATENT DOCUMENTS

| | | | | |
|---|---|---|---|---|
| 6,477,144 | B1* | 11/2002 | Morris et al. | 370/230.1 |
| 6,636,480 | B1* | 10/2003 | Walia et al. | 370/229 |
| 6,920,171 | B2 | 7/2005 | Souissi et al. | |
| 6,928,085 | B2* | 8/2005 | Haartsen | 370/462 |
| 7,013,339 | B2* | 3/2006 | Schwager | 709/226 |
| 7,031,720 | B2 | 4/2006 | Weerakoon et al. | |
| 7,177,275 | B2* | 2/2007 | Stanwood et al. | 370/230 |
| 7,187,669 | B1* | 3/2007 | Lee | 370/347 |
| 7,187,691 | B2 | 3/2007 | Gavette | |
| 7,218,644 | B1* | 5/2007 | Heinonen et al. | 370/468 |
| 7,283,494 | B2* | 10/2007 | Hammel et al. | 370/329 |
| 7,317,728 | B2 | 1/2008 | Acharya et al. | |
| 7,333,824 | B2* | 2/2008 | Zhang et al. | 455/502 |
| 7,385,958 | B2 | 6/2008 | Demirhan | |
| 7,486,696 | B2* | 2/2009 | Garg et al. | 370/468 |
| 7,489,651 | B2* | 2/2009 | Sugaya et al. | 370/322 |
| 7,561,591 | B2* | 7/2009 | Hiraoka et al. | 370/442 |
| 2002/0059408 | A1 | 5/2002 | Pattabhiraman et al. | |
| 2004/0137925 | A1 | 7/2004 | Lowe et al. | |
| 2005/0174958 | A1* | 8/2005 | Miller et al. | 370/321 |
| 2005/0259617 | A1* | 11/2005 | Wason et al. | 370/329 |
| 2006/0002312 | A1 | 1/2006 | Delattre et al. | |
| 2006/0239272 | A1* | 10/2006 | Heidari-Bateni et al. | 370/395.21 |

FOREIGN PATENT DOCUMENTS

| | | |
|---|---|---|
| EP | 1478133 A2 | 11/2004 |

OTHER PUBLICATIONS

Aiello et al., Multiband OFDM Physical Layer Specification, Release 1.0, Apr. 27, 2005.

Barr, "TG3 WiMedia Presentation to PC," Project: IEEE 802.15 Working Group for Wireless Personal Area Networks (WPANS), Nov. 11, 2002.

Batra et al., "Multiband OFDM Physical Layer Proposal for IEEE 802.15 Task Group 3a," MBOA-SIG Multiband OFDM Alliance SIG, Sep. 14, 2004.

Batra et al., "What is Really Fundamental?" MBOA Multiband OFDM Alliance SIG, Sep. 12, 2004, available at http://www.wimedia.org/en/resources/mboa_archives.asp.

Filauro, "Radio Control Interface for Host Wire Adapter," (2004).

Foerster, "State of International UWB Regulation in ITU," MBOA Multiband OFDM Alliance SIG, Sep. 14, 2004, available at http://www.wimedia.org/en/resources/mboa_archives.asp.

Froelich, "WiMedia Convergence Architecture," (2004).

Huang and Fidler, "Market Needs for a High Speed WPAN Specification," MBOA Multiband OFDM Alliance SIG, Sep. 14, 2004, available at http://www.wimedia.org/en/resources/mboa_archives.asp.

Intel, "Ultra-Wideband (UWB) Technology: Enabling High-speed Wireless Personal Area Networks," White Paper (2004).

Leeper et al., "Spectral Sculpting and a Future-Ready UWB," MBOA Multiband OFDM Alliance SIG, Sep. 14, 2004, available at http://www.wimedia.org/en/resources/mboa_archives.asp.

MBOA, "Ultrawideband: High-speed, Short-range technology with Far-reaching Effects," MBOA-SIG White Paper, Sep. 1, 2004.

McCrady et al., "Mobile Ranging With Low Accuracy Cloaks" IEEE (1999) 85-88.

Patwari et al., IEEE Transactions on Signal Processing (2003) 51(8):2137-2148.

Ranta, "MB-OFDM for Mobile Handsets," MBOA Multiband OFDM Alliance SIG, Sep. 13, 2004, available at http://www.wimedia.org/en/resources/mboa_archives.asp.

Razzell, "In-band Interference Properties of MB-OFDM," MBOA Multiband OFDM Alliance SIG, Sep. 4, 2004, available at http://www.wimedia.org/en/resources/mboa_archives.asp.

Razzell et al., "CCA Algorithm Proposal for MB-OFDM," MBOA Multiband OFDM Alliance SIG, Sep. 4, 2004, available at http://www.wimedia.org/en/resources/mboa_archives.asp.

Rosser, "Wireless Broadband: UWB Standards and Regulatory Update," Staccato Communications (2004).

Shoemake, "Multiband OFDM Update and Overview," MBOA Multiband OFDM Alliance SIG, Sep. 12, 2004.

Solomon et al., "Ultrawideband: A World Without Cables," CEA Webcast, Sep. 22, 2004, MBOA Multiband OFDM Alliance SIG, available at http://www.wimedia.org/en/resources/mboa_archives.asp.

Steggles et al., "Local positioning systems: New possibilities for urban combat training," presented at IITSEC 2003, Dec.

Taylor and Fleming, "Relationship of WUSB and other WiMedia\MBOA Specifications," (2004).

Taylor, (ed.) Technical Specification: MBOA MAC-PHY Interface, May 27, 2004.

Zheng and Lee, IEEE Communications Magazine (2004) Jun. 140-146.

USPTO, Non-Final Office Action, U.S. Appl. No. 11/388,888, dated Mar. 20, 2009.

USPTO, Final Office Action, U.S. Appl. No. 11/388,888, dated Sep. 11, 2009.

USPTO, Final Office Action, U.S. Appl. No. 11/388,888, dated Feb. 19, 2010.

* cited by examiner

KEY

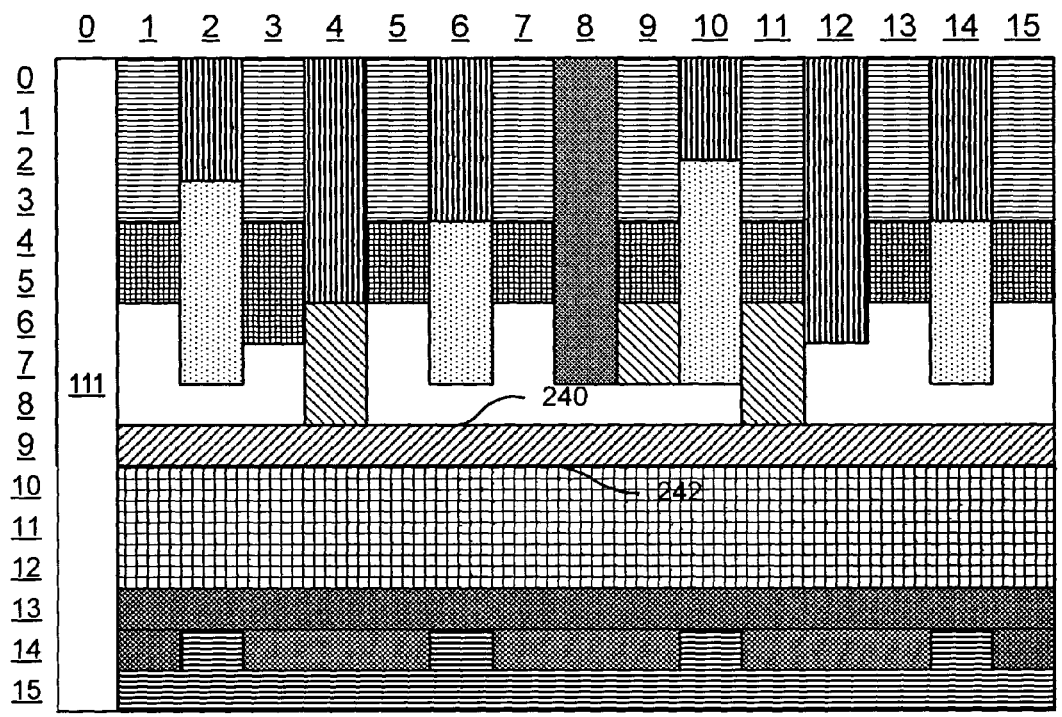
Fig. 13
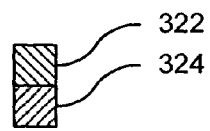
KEY

KEY

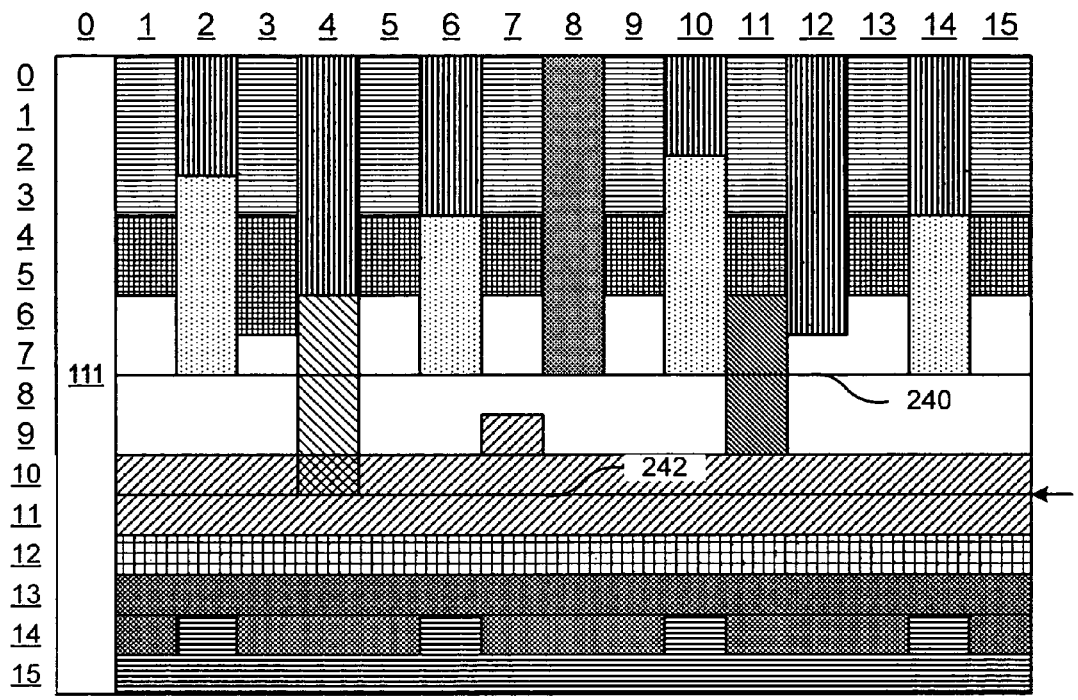
Fig. 15
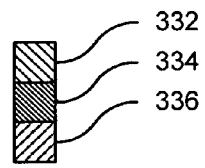
KEY

KEY

DEFRAGMENTATION OF COMMUNICATION CHANNEL ALLOCATIONS

CROSS REFERENCE TO RELATED APPLICATIONS

This application claims priority to the following U.S. patent provisional applications: Ser. No. 60/715,220, filed on Sep. 7, 2005; Ser. No. 60/675,296, filed on Apr. 26, 2005; Ser. No. 60/674,806, filed on Apr. 25, 2005; and Ser. No. 60/673,836, filed on Apr. 22, 2005, the disclosures of which are herein incorporated by reference in their entirety.

FIELD OF THE INVENTION

The present invention relates generally to communication channels, and more particularly to a system and method for coordinating communications activities on a communications channel.

BACKGROUND OF THE INVENTION

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks, to name a few.

Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel.

Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM (Frequency Division Multiplexing) is another technology that enables multiple devices to transmit their signals simultaneously over a communication channel in a wired or wireless setting. The devices' respective signals travel within their designated frequency band (carrier), onto which the data (text, voice, video, or other data.) is modulated. With adequate separation in frequency band spacing, multiple devices can simultaneously communicate across the same communication channel (network or point-to-point).

Orthogonal FDM (OFDM) spread spectrum systems distribute the data over a plurality of carriers that are spaced apart at precise frequencies. The spacing is chosen so as to provide orthogonality among the carriers. Thus, a receiver's demodulator recovers the modulated data with little interference from the other carrier signals. The benefits of OFDM are high spectral efficiency, resiliency to RF interference, and lower multi-path distortion or inter symbol interference (ISI). OFDM systems can be combined with other techniques (such as time-division multiplexing) to allow sharing of the individual carriers by multiple devices as well, thus adding another dimension of multiplexing capability.

However, even with various multiplexing schemes available to network and other communication channel designers, there can still be inefficiencies in bandwidth allocation due to factors such as fragmentation. Fragmentation can occur, for example, where short durations of network bandwidth are separated by unavailable network time slots, making it difficult for a communication process to properly allocate its communication packets in an efficient manner. As users come and go, the unoccupied slots within a communication window can easily get fragmented to the point that a user may not be able to find the required or the optimal configuration of the slots (whether they desire contiguous or uniformly distributed slots, or otherwise) to meet their needs.

BRIEF SUMMARY OF THE INVENTION

According to one embodiment, a method of a network device allocating its bandwidth utilization within a communication network governed by a utilization policy includes steps of the network device conducting communication activities within the communication network, the communication activities consuming an amount of available communication bandwidth within the network; the network device deviating from the utilization policy in scheduling or conducting network activities; and the network or the master/host imposing a penalty on the network device for deviating from the utilization policy. In one embodiment, the penalty imposed on the network device for deviating from the utilization policy is at least one of an extra monitoring task, extra reporting effort of reallocation of the network device's scheduled allocations, and a limitation in bandwidth utilization. Additionally, the penalty imposed on the network device can be self-imposed and can be the refusal of a reward otherwise granted for conforming to a reallocation request.

The penalty imposed can be dynamically selected based on current network status and can vary based on several factors. The factors can include, for example, the magnitude of the deviation from the utilization policy, the frequency of deviation by the network device, the number of times the network device has deviated from the utilization policy, and the status of the network. Further, the invention can be implemented such that the penalty is imposed only where the scheduled utilization conflicts with scheduled utilization of another network device.

In one embodiment, reservations by the network device not conforming to the utilization policy are announced to other network devices, and such other network devices determine whether and to what extent to preempt the non-conforming network device. Preemption can be done on a priority basis.

In another embodiment, a method of dynamically allocating communication bandwidth among a plurality of network devices includes the steps of: monitoring one or more conditions of the network; determining whether the network is operating within predetermined tolerance levels for at least one of the monitored conditions; and requiring one or more of the network devices to modify their network behavior when the network is operating outside of predetermined tolerance levels for at least one of the monitored conditions. In one embodiment, the network is a distributed network and the step of monitoring is performed by one or more network devices. The monitored conditions can include, for example, bandwidth utilization, conformance of network devices with the utilization policy, and levels of defragmentation on the network.

The penalty imposed on the network device for deviating from the utilization policy can include, for example, an extra monitoring task, extra reporting effort of reallocation of the network device's scheduled allocations, a limitation in bandwidth utilization, and accepting preemption made by other devices. Additionally, the penalty imposed on the network device can be self-imposed and can be the refusal of a reward otherwise granted for conforming to a reallocation request.

Additionally, the method can further include the step of allowing network devices to implement incentivized defragmentation when the network is operating within predetermined tolerance levels for at least one of the monitored conditions.

The penalty imposed can be dynamically selected based on current network status and can vary based on several factors. The factors can include, for example, the magnitude of the deviation from the utilization policy, the frequency of deviation by the network device, the number of times the network device has deviated from the utilization policy, and the status of the network. Further, the invention can be implemented such that the penalty is imposed only where the scheduled utilization conflicts with scheduled utilization of another network device.

In one embodiment, reservations by the network device not conforming to the utilization policy are announced to other network devices, and such other network devices determine whether and to what extent to preempt the non-conforming network device. Preemption can be done on a priority basis.

Another embodiment includes a network device configured to operate within a communication network, the network device including: a housing; at least one of a transmitter and receiver in the housing; control logic within the housing and configured to schedule communication activities across the communication network in accordance with a utilization policy; wherein the control logic is further configured to determine whether the network device is deviating from the utilization policy in scheduling communication activities and to impose a penalty on the network device for deviating from the utilization policy. In one embodiment, the penalty imposed on the network device for deviating from the utilization policy is at least one of an extra monitoring task, extra reporting effort reallocation of the network device's scheduled allocations, a limitation in bandwidth utilization, and accepting preemptions. Additionally, the penalty imposed on the network device can be self-imposed and can be the refusal of a reward otherwise granted for conforming to a reallocation request.

The penalty imposed can be dynamically selected based on current network status and can vary based on several factors. The factors can include, for example, the magnitude of the deviation from the utilization policy, the frequency of deviation by the network device, the number of times the network device has deviated from the utilization policy, and the status of the network. Further, the invention can be implemented such that the penalty is imposed where only where the scheduled utilization conflicts with scheduled utilization of another network device.

In one embodiment, reservations by the network device not conforming to the utilization policy are announced to other network devices, and such other network devices determine whether and to what extent to preempt the non-conforming network device. Preemption can be done on a priority basis.

Another embodiment includes a network device configured to operate within a communication network, the network device including: a housing; at least one of a transmitter and receiver in the housing; control logic within the housing configured to schedule communication activities of the network device, and to modify scheduling of communication activities when the scheduled activities deviate from the utilization policy and the network is operating outside of predetermined levels for a condition of the network. In one embodiment, the network is a distributed network and the control logic is further configured to monitor the condition of the network and the condition of the network comprises at least one of bandwidth utilization, conformance of network devices with the utilization policy, and levels of defragmentation on the network.

In one embodiment, the penalty imposed on the network device for deviating from the utilization policy is at least one of an extra monitoring task, extra reporting effort reallocation of the network device's scheduled allocations, and a limitation in bandwidth utilization. Additionally, the penalty imposed on the network device can be self-imposed and can be the refusal of a reward otherwise granted for conforming to a reallocation request.

The penalty imposed can be dynamically selected based on current network status and can vary based on several factors. The factors can include, for example, the magnitude of the deviation from the utilization policy, the frequency of deviation by the network device, the number of times the network device has deviated from the utilization policy, and the status of the network. Further, the invention can be implemented such that the penalty is imposed where only where the scheduled utilization conflicts with scheduled utilization of another network device.

In one embodiment, reservations by the network device not conforming to the utilization policy are announced to other network devices, and such other network devices determine whether and to what extent to preempt the non-conforming network device. Preemption can be done on a priority basis.

In yet another embodiment, an executable program product configured in a storage medium and including a body of program code executable by a processor is provided for allocating the bandwidth utilization of a network device, the executable program product includes: program code for scheduling communication activities of a network device within the communication network; program code for determining when the communication activities deviate from a utilization policy of the communication network; and program code for imposing a penalty on the network device where scheduled communication activities deviate from the utilization policy.

In one embodiment, the penalty imposed on the network device for deviating from the utilization policy is at least one of an extra monitoring task, extra reporting effort reallocation of the network device's scheduled allocations, and a limitation in bandwidth utilization. Additionally, the penalty imposed on the network device can be self-imposed and can be the refusal of a reward otherwise granted for conforming to a reallocation request.

The penalty imposed can be dynamically selected based on current network status and can vary based on several factors. The factors can include, for example, the magnitude of the deviation from the utilization policy, the frequency of deviation by the network device, the number of times the network device has deviated from the utilization policy, and the status of the network. Further, the invention can be implemented such that the penalty is imposed where only where the scheduled utilization conflicts with scheduled utilization of another network device.

In one embodiment, reservations by the network device not conforming to the utilization policy are announced to other network devices, and such other network devices determine whether and to what extent to preempt the non-conforming network device. Preemption can be done on a priority basis.

In one embodiment, the executable program can further comprise program code means for modifying the scheduling of communication activities when the scheduled activities deviate from the utilization policy and the network is operating outside of predetermined levels for a condition of the network.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following FIGS. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 13 is diagram illustrating another example allocation of communication activities in an example communication window.

FIG. 15 is diagram illustrating another example allocation of communication activities in an example communication window.

DESCRIPTION OF THE PREFERRED EMBODIMENTS

Figure 1:
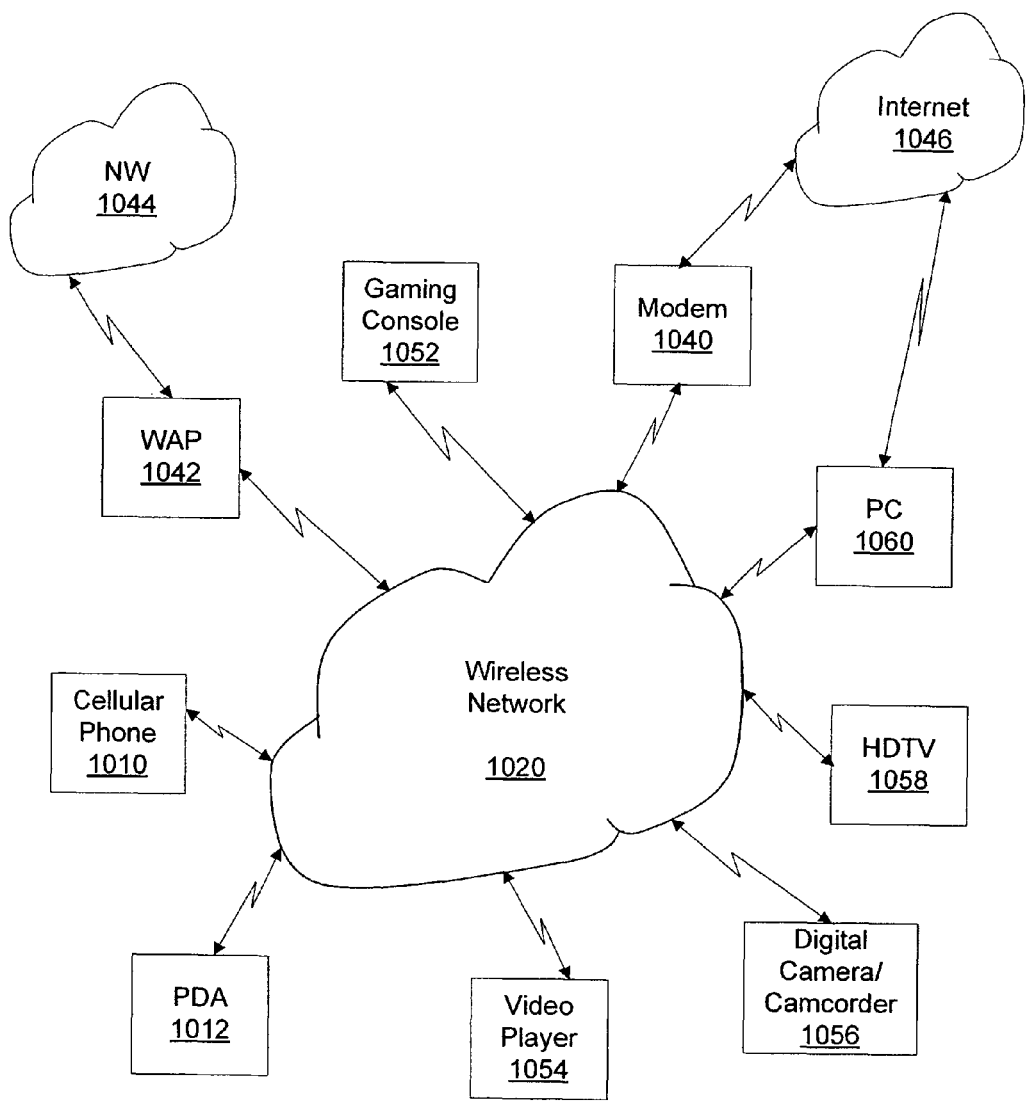
FIG. 1 is a block diagram illustrating one possible configuration of a wireless network that can serve as an example environment in which the present invention can be implemented.

The present invention is directed toward a system and method for providing defragmentation of communication channel allocations. The communication channel can be that of a communication network or other communication channel. One example communication channel is a wireless network. An exemplary implementation of a wireless network is a network as specified by the WiMedia-MBOA (Multiband OFDM Alliance), although the invention can be implemented with other networks and communication channels as well.

Before describing the invention in detail, it is useful to describe an example environment in which the invention can be implemented. One such example is a wireless beaconing network in which multiple electronic devices (for example, computers and computing devices, cellular telephones, personal digital assistants, motion and still cameras, among others) can communicate and share data, content and other information with one another. One example of such a network is that specified by the WiMedia standard (within WiMedia and Multi-Band OFDM Alliance). From time-to-time, the present invention is described herein in terms of a distributed network or in terms of the WiMedia standard. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a distributed wireless network, nor is it limited to the MB-UWB standard described as one implementation of the example environment.

Most network standards specify policies or rules that govern the behavior of network connected devices. The WiMedia standard specifies the mechanism and policies that are to be followed by W-USB and WiNet compliant devices in order to allow for an ad hoc and distributed network of such devices to operate efficiently. Policies, requirements, protocols, rules, guidelines or other factors used to incentivize, recommend, specify, govern, control or manage the behavior of devices operating in a communication network are generally referred to herein as utilization policies.

In most distributed networks, the network of the devices is maintained by requiring all devices to announce parameters such as their presence, their capabilities and their intentions for reserving transmission slots and so on. For example, with the WiMedia standard, this can be done during what are referred to as beacon period time slots. According to this standard, devices joining the network are expected to monitor the beacon period to learn about the network status and parameters before attempting to use the network. In other network configurations, beacon periods are similarly used to allow management of network devices as described more fully below. Thus, beacon periods are one form of window or network period during which scheduling or other housekeeping activities can be conducted. Beacon periods in the above-referenced standard, and other time periods used for scheduling or other housekeeping chores in other network configurations, are generally referred to as scheduling windows.

Devices are typically allowed to enter a power save mode to conserve power and possibly prolong operation. For example, battery operated devices may enter a sleep mode or even a deep-sleep mode, wherein one or more of their functions are diminished or shut down in order to conserve power. Depending on the environment, devices may be allowed to enter into a sleep mode for short or long periods of time. For example, a sleep mode can be an energy-saving mode of operation in which some or all components are shut down or their operation limited. Many battery-operated devices, such as notebook computers, cell phones, and other portable electronic devices support one or more levels of a sleep mode. For example, when a notebook computer goes into one level of sleep mode, it may turn off the hard drive and still allow the user to perform operations, only powering up the hard drive when access is needed. In a deeper level of sleep, the computer may further turn off the display. In yet a further level of sleep, the computer may enter a hibernate state. Likewise, other electronic devices communicating across a communication channel may have similar sleep states and may power down unnecessary or unused components, including an RF transceiver, depending on a number of factors such as elapsed time, activities and so on. As described below, in accordance with one embodiment, devices may be prompted to enter a sleep mode upon completion of scheduling or other housekeeping activities and be configured to awaken for scheduled activities such as, for example, communication activities.

FIG. 1 is a block diagram illustrating one possible configuration of a wireless network that can serve as an example environment in which the present invention can be implemented. Referring now to FIG. 1, a wireless network 1020 is provided to allow a plurality of electronic devices to communicate with one another without the need for wires or cables between the devices. A wireless network 1020 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 1020 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 1020 includes a communication device to allow it to communicate with external networks. More particularly, in the illustrated example, wireless network 1020 includes a modem 1040 to provide connectivity to an external network such as the Internet 1046, and a wireless access point 1042 that can provide external connectivity to another network 1044.

Also illustrated in the example wireless network 1020 are portable electronic devices such as a cellular telephone 1010 and a personal digital assistant (PDA) 1012. Like the other electronic devices illustrated in FIG. 1, cellular telephone 1010 and PDA 1012 can communicate with wireless network 1020 via the appropriate wireless interface. Additionally, these devices may be configured to further communicate with an external network. For example, cellular telephone 1010 is typically configured to communicate with a wide area wireless network by way of a base station.

Additionally, the example environment illustrated in FIG. 1 also includes examples of home entertainment devices connected to wireless network 1020. In the illustrated example, electronic devices such as a gaming console 1052, a video player 1054, a digital camera/camcorder 1056, and a high definition television 1058 are illustrated as being interconnected via wireless network 1020. For example, a digital camera or camcorder 1056 can be utilized by a user to capture one or more still picture or motion video images. The captured images can be stored in a local memory or storage device associated with digital camera or camcorder 1056 and ultimately communicated to another electronic device via wireless network 1020. For example, the user may wish to provide a digital video stream to a high definition television set 1058 associated with wireless network 1020. As another example, the user may wish to upload one or more images from digital camera 1056 to his or her personal computer 1060 or to the Internet 1046. This can be accomplished by wireless network 1020. Of course, wireless network 1020 can be utilized to provide data, content, and other information sharing on a peer-to-peer or other basis, as the provided examples serve to illustrate.

Also illustrated is a personal computer 1060 or other computing device connected to wireless network 1020 via a wireless air interface. As depicted in the illustrated example, personal computer 1060 can also provide connectivity to an external network such as the Internet 1046.

In the illustrated example, wireless network 1020 is implemented so as to provide wireless connectivity to the various electronic devices associated therewith. Wireless network 1020 allows these devices to share data, content, and other information with one another across wireless network 1020. Typically, in such an environment, the electronic devices would have the appropriate transmitter, receiver, or transceiver to allow communication via the air interface with other devices associated with wireless network 1020. These electronic devices may conform to one or more appropriate wireless standards and, in fact, multiple standards may be in play within a given neighborhood. Electronic devices associated with the network typically also have control logic configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network. Software can include program code that is executable by a processing device to perform the desired functions.

Electronic devices operating as a part of wireless network 1020 are sometimes referred to herein as network devices, members or member devices of the network or devices associated with the network. In one embodiment devices that communicate with a given network may be members or merely in communication with the network.

Some communication networks are divided into periods or frames that can be used for communication and other activities. For example, as discussed above, some networks have a scheduling window such as, for example, a beacon period, for scheduling upcoming communication activities. Also, some networks have a communication window during which such communication activities take place. In the WiMedia-MBOA standard, the bandwidth is divided into superframes, which in turn are divided into time slots for the transmission and reception of data by the various electronic devices associated with the network.

Figure 2:
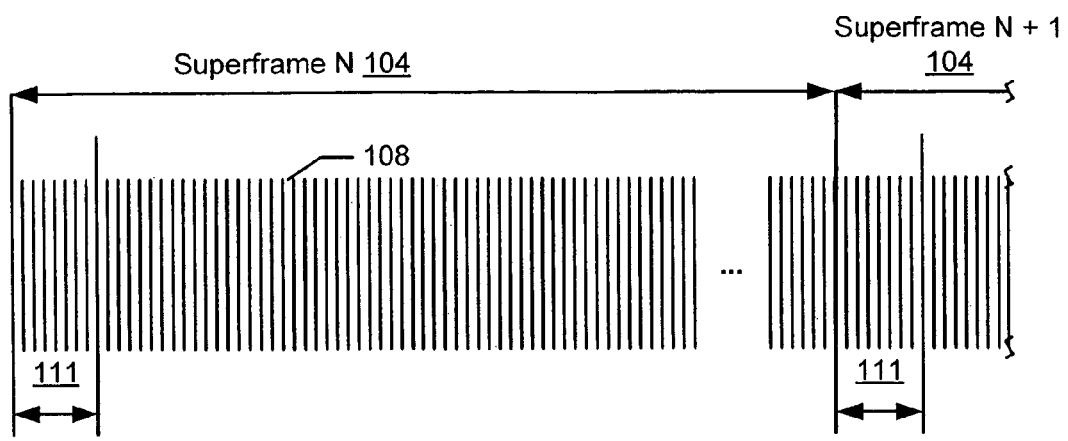
FIG. 2 is a diagram illustrating one possible configuration of a communication window that can serve as an example environment in which the present invention can be implemented.

An example of such time slots are illustrated in FIG. 2. Referring now to FIG. 2, in this exemplary environment, the communication bandwidth is divided into superframes 104 (two illustrated), each superframe 104 itself being divided into a plurality of timeslots referred to as Media Access Slots 108. In the example environment, there are 256 media access slots 108 in each superframe 104, although other allocations are possible. Additionally, at the beginning of each superframe 104 is a beacon period 111, which is comprised of a plurality of beaconing slots. In some networks, the beacon period 111 is a period during which devices reserve timeslots and exchange other housekeeping or status information. For example, in the WiMedia-MBOA distributed wireless network, the superframes comprise a beacon period 111, during which devices are awake and receive beacons from other devices. Superframes in the above-referenced standard, and other time periods used for communications among devices in other network configurations, with or without scheduling windows, are generally referred to herein as communication windows. As noted above, for clarity of description the present invention is described in terms of the example environment, and thus is at times described using the terms superframe and beacon period. As would be apparent to one of ordinary skill in the art after reading this description, the invention applies to other communication formats, including the more general case utilizing scheduling windows and communication windows. Additionally, the invention is not limited to applications where the bandwidth is divided into frames or windows, but can be generally applied to communication channels and networks of various protocols and configurations.

Having thus described an example environment in which the invention can be implemented, various features and embodiments of the invention are now described in further detail. Description may be provided in terms of this example environment for ease of discussion and understanding only. After reading the description herein, it will become apparent to one of ordinary skill in the art that the present invention can be implemented in any of a number of different communication environments (including wired or wireless communication environments, and distributed or non-distributed networks) operating with any of a number of different electronic devices and according to various similar or alternative protocols or specifications.

In the example environment of the WiMedia-MBOA network, the wireless network is a distributed wireless network, which is typically defined as a network having no designated master or host to control traffic on its channels. Thus, instead of a host controlling bandwidth access for example, these networks typically rely on self policing, or self-control on the part of the various electronic devices associated with the network to conform to network policies, guidelines or standards. In this example network, each electronic device associated with the network can reserve certain time slots of each superframe to transmit its packets based on its Quality of Service or power conservation requirements. As such, the network load is dynamically distributed and can be changed within a superframe as time progresses. As users come and go, the unoccupied slots within a superframe can easily get fragmented to the point that a user may not be able to find the required or the optimal configuration of the slots (either contiguous or uniformly distributed, or otherwise) to meet their needs. This problem can also exist in other types of networks or scheduled communication channels where access slots become fragmented. However, the problem and the solutions provided by the present invention are not limited to communication channels scheduled on the basis of time. Fragmentation can also exist with channels having bandwidth access shared on the basis of frequency division, code division, spatial division and other mechanisms. As such, the solutions presented herein, can be applied across these various forms of communication channels.

This problem can be similar to fragmentation problem that often occurs on hard drives, which could hurt performance if not addressed. However, because the network's bandwidth allocation space (for example, a superframe in the case of an MBOA channel) is usually much smaller than a typical hard drive in capacity, this problem can arise relatively quickly in the case of a communication channel. Additionally, the problem could become debilitating for some electronic devices that may desire or even require a particular slot configuration for proper operation. In a highly fragmented network, even if there are plenty of slots open, without defragmentation or without proper allocation and reallocation schemes, a user's use of the network could become hampered or rendered impossible.

Utilization policies can be implemented to define appropriate bandwidth utilization among devices, as well as other network behavior. Utilization policies can help with defragmentation of the network, which is preferably implemented so as to take place without disrupting service, or with only minimal disruption. Defragmentation can be implemented in various ways, depending on the network devices and the communication goals and objectives. For example, defragmentation might be accomplished by providing a communication device with the ability to combine its reservations in contiguous time slots. As another example, defragmentation can encompass providing reservations slots in a predetermined pattern or other basis. As these examples illustrate, other allocations can be sought as an outcome of the defragmentation process to allow for improved utility of the available capacity for the various devices, users or applications. Because defragmentation or other reallocation is possible in a number of ways but there is a possibility that it could be quite time consuming or disruptive, it is preferable that it be kept simple and effective.

For each communication channel or communication network, depending on what type of applications are expected on that network, the term defragmentation can take on different meanings. The terms "defragmentation" and "defragmented" do not necessarily refer to complete defragmentation. In other words, these terms do not necessarily imply that all of the reserved slots are packed together as contiguously as possible. In other words, there can be varying degrees of fragmentation or defragmentation. In fact, in some embodiments, it may be preferable to be defragmented in such a way so as to distribute some or all of the reservations of one or more devices in such a way as to let other such applications receive their desired service interval. This can arise, for example, where a device or class of devices may have certain limitations on its or their service intervals. Thus, the term defragmentation and its variants can also refer to reallocation of bandwidth among devices.

According to one embodiment of the invention, defragmentation can be implemented to take place by mandate, where network devices are required to defragment according to one or more policies. In accordance with another embodiment of the invention, network devices are incentivized to follow utilization policies, including defragmentation practices. That is, a device can be either obligated or required to adjust its timeslot utilization or it can be given incentives to adjust its utilization—for example, positive to do so, or negative incentives for not doing so. Thus, for example, a device can be either obligated to move its slot reservations to a more optimal location within the window of slots within a certain period of time. Alternatively, policies or procedures could be adopted or implemented in such a way that rather than mandating a device to move its slots, there may be penalties (for example, performance penalties) that it could incur by not moving its slots or benefits (for example, performance benefits) gained by so moving its slots.

Additionally, a hybrid approach is provided, wherein a combination of requirements and incentives (positive or negative incentives) can be provided to manage the defragmentation process. For example, a network may operate in such a way as to allow incentivized defragmentation where the network is operating well within its capacity, and switch to a mandated or obligatory defragmentation during periods of heavy utilization where bandwidth is at a premium. Thus, the network can be monitored in real time or near real time based on factors such as, for example, current channel loading, network performance, or other factors.

Figure 3:
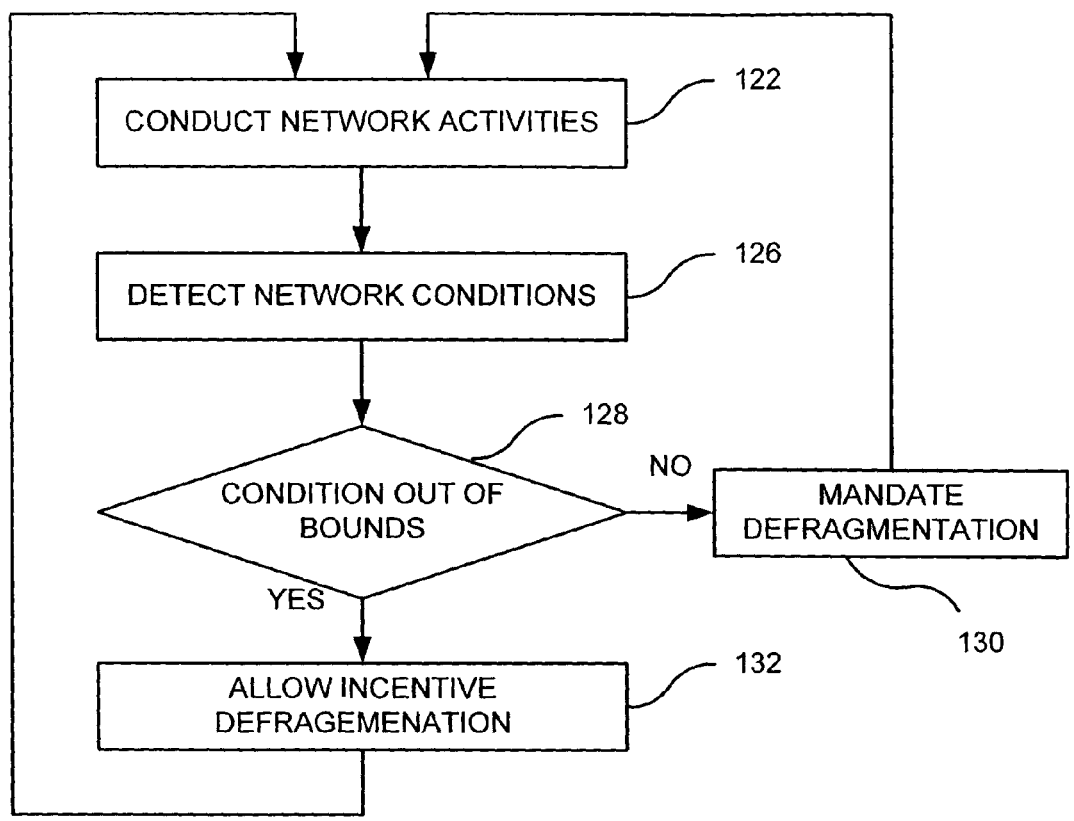
FIG. 3 is an operational flow diagram illustrating one method for dynamic allocation in accordance with one embodiment of the invention.

FIG. 3 is an operational flow diagram illustrating a process for implementing a hybrid approach to incentive defragmentation in accordance with one embodiment of the invention. Referring now to FIG. 3, in a step 122 communications activities are conducted across the channel. For example, network devices conduct normal activities communicating with other network devices across the network.

In a step 126, one or more network conditions are monitored to detect conditions that could indicate operational concerns. Several examples are highlighted to illustrate such possible conditions. For example, bandwidth utilization can be monitored to determine whether the network is at or near capacity, or over utilized. As another example, the status of network devices can be monitored to determine whether a device is operating out of conformance with network parameters, requirements, protocols or other such utilization policies. Additionally, levels of defragmentation on the network can be monitored. As these examples indicate, other network conditions can also be monitored to determine whether current defragmentation policies are acceptable, or whether a change is mandated. The monitoring can take place by a network master, where such device exists, by one or more devices associated with a distributed network, or by each device on its own based on the policies of a standard protocol.

Where it is determined that the network is operating out of tolerance or acceptable bounds for one or more of the network conditions, the network can transition from an incentivized mode to a mandated mode (or remain in a mandated mode), requiring devices to implement defragmentation policies at least to a certain extent. This is illustrated by steps 128 and 130 in FIG. 3. Alternatively, where the network is operating within defined bounds, the network devices are instructed to transition to (or are allow to remain in) incentivized mode, such that the network devices can make their own determinations as to the level of defragmentation implemented. This is illustrated by steps 128 and 132 in FIG. 3.

Incentive approaches for defragmentation can be implemented in a number of different ways. A network device may be requested to move or adjust its slot allocation to help the system maintain or improve its level of defragmentation. This can be accomplished, for example, inherently through protocols, usage requirements or other such utilization policies, or explicitly by request of other devices/hosts. In this example, the device in question may be rewarded with increases in bandwidth allocation, for example, for conforming to the request. As indicated, in another embodiment, the device in question may be penalized by, for example, limiting future bandwidth allocations if the device does not conform to the request.

In such incentivized approaches, the system can provide the freedom of choice with the device such that if an application is necessarily unable to move its reservation slots due to some unforeseen circumstances, that it can continue its operation without disruption, but perhaps at a cost of performance. Additionally, the incentivized form of defragmentation can be implemented so as to place certain burdens on the offending devices such that they would be opting for non-offensive reservations within the network whenever possible. This extra burden could be in the form of extra monitoring tasks, extra reporting effort, limitation in bandwidth utilization, etc.

In one embodiment, the choices of particular penalties or rewards as well as choices between penalties and rewards may be made dynamically based on a current status or health of the network. Thus, where bandwidth is particularly tight during a given period, for example, it may be determined that the incentive is a bandwidth penalty for non-compliance with the request. In furtherance of this example, and in terms of the example environment, network devices may be implemented so as to detect bandwidth utilization, and to self-impose predetermined penalties for not conforming to defragmentation guidelines depending on the network condition.

In another embodiment, dynamic incentives can be implemented to vary based on the magnitude of the offense; the frequency, quantity or number of times a given device has committed offenses; the status of the network or any of a number of other factors. Thus, for example, penalties can become more severe for a device that frequently ignores requests, or more severe as network conditions degrade. For example, where bandwidth is becoming increasingly tight, the bandwidth penalty (or other incentive) for non-compliance can be increased accordingly. Thus, as network conditions become more severe, the incentives become greater. In furtherance of this example, and in terms of the example environment, network devices may be implemented so as to detect bandwidth utilization, and to self-impose increasing levels of predetermined penalties for not conforming to defragmentation guidelines as network conditions dictate.

Various techniques can be used to enforce the incentives as may be desired or appropriate for the network application. For example, in the example WiMedia network and others a methodology (for example, within the Medium Access Control layer) can be implemented to announce the offending reservations of a device to other network devices. Thus, the other network devices receiving announcement of such reservations can determine whether and to what extent to pre-empt the offending devices out of their slots. The above-described preemption mechanism can be accomplished in a number of different ways. For example, the preemptor can announce allowable reservations that overlap with the preemptible reservations of the offending device. This overlap can be detected by the offender and indicate to the offender that it should move or remove its reservations.

In another embodiment, a network master can be provided with the ability to deny bandwidth requests from the offending device or to otherwise appropriately allocate bandwidth among network devices in accordance with the policies as may be in effect. In yet another embodiment, network devices can be implemented so as to be self policing in that they impose their own penalties for non-conformance with defragmentation guidelines. For example, a network device may opt to not follow defragmentation guidelines and in return not utilize an appropriate amount of bandwidth as indicated by the guidelines. Additionally, a device may dynamically monitor the network conditions and defragment or change its reservations, if monitored conditions change (for example, more users join the network, available bandwidth becomes tighter, or levels of fragmentation reach a predetermined threshold).

In one embodiment, a device can be identified as being an offending device vis-à-vis the reservations using any of a number of different techniques. For example, the device's reservation request can be compared relative to what reservations are permitted or acceptable to determine whether the device is violating the reservation protocol. As another example, a device may identify or announce its reservation request and the other devices are configured to determine whether the reservation is an offense. A further example of one scenario where a device may be considered an offending device is a situation where a device designated to operate in an unrestricted region of the communication channel requests reservations that extend into the restricted region.

Offending devices can be configured to notify others that they are in violation of the reservation protocol or utilization policy. One way to accomplish this is for the offending device to set a flag (for example, it can set a bit to a designated state) indicating that it is in violation of the policy. Another way is to announce the offense to other devices during the beacon period so that other devices are aware that the device is out of conformance. The device may also provide details of the offense such as, for example, an identification of requested slots that are out of conformance. Other devices may, depending on the network configuration, be able to preempt the offending device. Examples of such preemption are discussed further herein in one embodiment.

In one embodiment, until preemption or other penalties takes place, the offending device may be permitted to continue with its reservations without modifying its behavior. The network device can be implemented so as to be aware that as long as it continues its offending behavior, it may be subject to preemption by other devices or other penalties. Thus, the network devices can be implemented to, over time and as other slots become empty, transition its reservations or modify its behavior so that it is out of the danger of penalties. This very act of voluntary movement of slots can lead to defragmentation of the communication window.

In one embodiment, defragmentation can be implemented to allow for flexibility of slot reservation and usage as well. For example, one compromise that can be implemented is to let the network devices choose any reservation they like or need, as long as there are no other users contending for some or all of those slots. Once a contention for those slots occurs, then the offending device is expected to move its reservations, and can be asked to, required to or incentivized to move its reservations. This approach allows for freedom of choice on per-device basis, but also gives the network in general the ability to manage resources. In this embodiment, the network can be described as having veto power (whether implemented by a master, by self policing of devices, by other network devices pre-empting the offending device or otherwise), when necessary, to force an offending device out of an offensive slot. This veto power can be implemented so as to ensure that network performance is maintained to a desired level and that available bandwidth is equitably distributed among all devices.

As the above example illustrates, one advantage of the incentivized approach is that devices can be given the freedom to make certain choices to optimize their performance, and in hybrid embodiments or embodiments where incentives are dynamic, network performance can be assured, at least to a certain level. For example, a device with certain power constraints and with relatively low bandwidth requirements may opt for a particular fragmentation that conserves power by maximizing sleep time at the cost of having a lower bandwidth allocation.

As noted above, in one embodiment the devices are self regulating in that they are implemented so as to follow the prescribed reservation policies and to yield to other devices in accordance with those policies. One technique for ensuring compliance with these policies is to require interoperability testing for the devices as part of a certification process.

One approach to implementing the above is to split the channel (for example, a superframe of timeslots) into zones, where the zones can be pre-designated for certain applications or types of applications or for utilization by certain types or classes of devices, or designated from time-to-time for allocation and reallocation to certain types of applications or for utilization by certain types or classes of devices. Zones can also be pre-designated to more than one application or device (or class thereof) such that a designation might be shared among multiple entities. This sharing can be done on an equal footing basis, where the designated entities share the slots on par with one another, or on a weighted or priority basis. For example, the sharing can be done on a priority basis wherein one of the sharing entities takes priority over another sharing entity and they both take priority over all other non-sharing entities.

As one example, certain timeslots may be designated for real-time content delivery devices, such as for example video devices. In this example, a video device can preempt other non-video devices from utilizing certain zones or groupings of slots. For example, the network might be implemented such that a DVD player and a video recorder on the network could preempt other non-video devices from their designated slots or zone of slots. As a further example, a DVD player tasked with playing video content in real time (for example streaming video to an HDTV monitor) might be designated as taking priority over a video recording downloading content for storage or archival purposes to a network drive. Thus, in this further example, the DVD player would have the ability to preempt the video recorder from the DVD player's designated slots or zone of slots. However, because network users do not always have a priori knowledge of what types of applications or devices will be using the network in each instance and location, in order to allow for maximum network utility, each device can be given the freedom to use any slots it can or prefers without regard to the pre-designated zone.

As the above example illustrates, network devices designed for a particular application can have different requirements in terms of data rate, throughput, power consumption, etc. In order to perform their functions and provide efficiency in terms of complexity, cost and power management, network devices can be implemented so as to enable flexible allocation of bandwidth (such as, for example, the allocation of MAC superframe slots in the example environment).

For example, some network devices routinely transfer large amounts of data (such as FTP transfers, media transfers, and so on) to and from storage devices and other devices. Such devices often benefit from a reservation policy allowing continuous transfer. However, continuous transfers of large amounts of data can tie up network resources at the expense of other network devices. Thus, in one embodiment, the network can be configured to allow such devices to wait for an appropriate transfer window, deliver all the desired data at once, or in large blocks, and then go into a sleep mode or other power saving mode. For example, large transfers can be scheduled for periods of quiet time or periods where network utilization is at a minimum.

Another type of network device, for example a video playback device, may deliver time sensitive data in small but continuous blocks. The data can be divided into blocks and distributed across multiple windows, but some level of continuity is desired. For example, for video playback, the content information does not always need to be delivered all at once, but can be delivered as it is played, preferably with some buffer amount, and with continuity. Therefore, in one embodiment, such devices are allowed to reserve MAC slots at specific intervals. Furthermore, in another embodiment the invention can be implemented to provide a dynamic allocation and re-allocation policy allowing devices that benefit from a continuous transmission to allocate the required MAC slot resources while defining policy to release those continuous slots when devices with strict timing requirements (and as such, higher priority) request some of the super-frame slots.

In one embodiment, the window (for example, a superframe 104) can be divided into sections. For example, the communication window can be divided into two sections—a restricted section and an unrestricted section. In one embodiment, a network device making reservations in the unrestricted areas is permitted to allocate several consecutive slots within that zone. In one embodiment, the allocation can be made up to the slot boundaries, and those boundaries are hard-defined and cannot be moved. This embodiment, however, can result in restrictive and inefficient utilizations. For example, a scenario may arise that unnecessarily restricts the operation of time sensitive devices even when no device operates in the unrestricted area.

Figure 4:
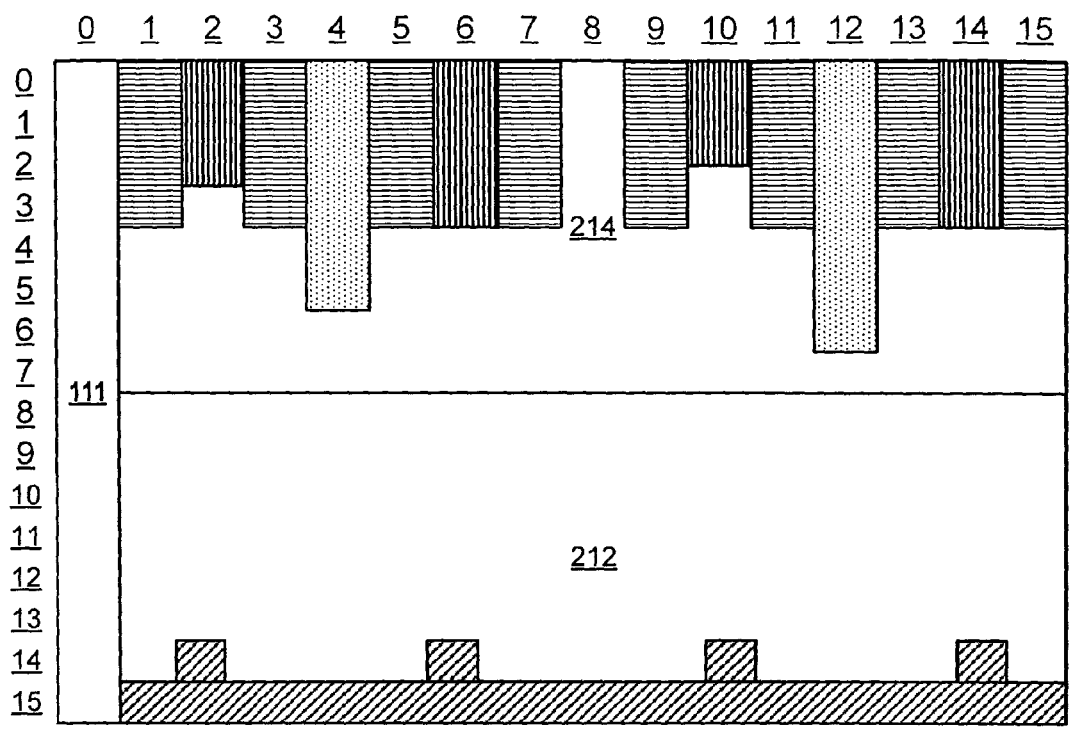
FIG. 4 is diagram illustrating an example allocation of communication activities in an example communication window.

Although a dynamic implementation can be utilized that allows adjustment of the boundary between the zones, difficulties may arise with this solution. For example, rules can be defined to specify and allow for the boundary between restricted and unrestricted areas to be adjusted or moved dynamically adjusting the amount of bandwidth allocated among device types. For an illustration of a difficulty that may arise with this second solution, consider an example hypothetical allocation of a superframe 104 as presented in FIG. 4. In this example scenario the communication portion of superframe 104 is divided into a restricted region 212 and an unrestricted region 214. For purposes of illustration, assume there are a limited number of device types operating within the two-dimensional slot allocation table (shaded regions 204, 206, and 208). In this depiction, vertically contiguous slots are contiguous in time. The areas marked 202 are pre-designated for contention-based allocation and are not available for reservation-based allocation. In this example the time sensitive devices 204 occupy less then 8% of the total allocation with an additional 23% of the available bandwidth occupied by the remaining devices (designated as shaded areas 206, 208) and contention-based allocations 202.

Figure 5:
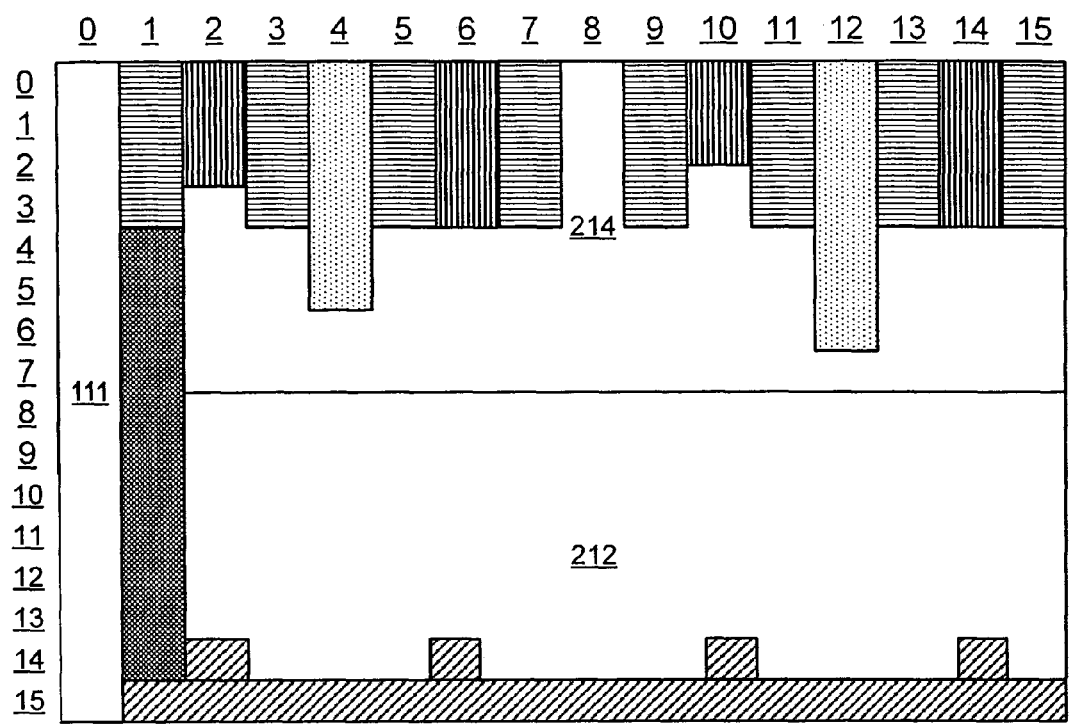
FIG. 5 is diagram illustrating another example allocation of communication activities in an example communication window.

To further illustrate, consider what could happen when an additional device with the preferred mode of operation as unrestricted enters the network. Assume that to satisfy its bandwidth requirements, the added device needs to reserve 11 media access slots per superframe 104. This is illustrated in FIG. 5 as shaded regions 210. To minimize its power consumption, the preferred mode of operation for the new device is sending all packets 210 in a continuous mode (vertically) and as close to the beacon period 111 as possible. However, this allocation is not allowed under either of the above solutions. Even though in the illustrated scenario, almost 70% of the available bandwidth is not used—and may never be used—these solutions would cause the device to distribute its slots in different zones across the channel to some extent, and thus have to "wake up" at least three times (or remain awake for a longer period of time) in order to satisfy its bandwidth requirements. In other words, the device would have to break up its transmissions into smaller vertical chunks to fit within the unrestricted region 214.

To address this potential shortcoming, one embodiment of the invention provides for dynamic allocation of reservations. More particularly, in one embodiment, the invention provides a dynamic allocation of reservations for timeslots that are required or preferred to be contiguous (e.g., vertical reservations in the superframe representation illustrated in FIGS. 4 and 5). Such allocation can be reallocated in one embodiment to give preference to delay sensitive devices that prefer to have their bandwidth distributed over the superframe relatively evenly (e.g., horizontal reservations).

To illustrate dynamic allocation, consider an example defined in terms of the example environment. In this environment, a WiMedia-MBOA device as defined by the WiMedia-MBOA specifications can be configured to send and receive a beacon frame before any transmission activities. Within this beacon frame, each device can define its capabilities, transmission requirements (i.e., reservation of MAC slots), control information, etc. In one embodiment, dynamic allocation of vertical reservations can be permitted while still providing some level of bandwidth protection for the delay sensitive devices. This can be accomplished, for example, by requesting release of the additional MAC slots 108 from the restricted area 212.

In the example environment, the MAC specification document version 0.95, the DRP Allocation field is redefined from the settings in Table 1 below to the settings in Table 2 below.

TABLE 1

| Octets: 2 | 2 |
|---|---|
| Zone Bitmap | MAS Bitmap |

TABLE 2

| Octets: 1 | 1 | 2 |
|---|---|---|
| UMR | Zone Map | MAS Bitmap |

Because there are only 15 zones in the example environment, the zones can be encoded using only four bits from the Zone Bitmap field while leaving the remaining four bits reserved for future use. Furthermore, the first octet can be designated for the Unrestricted Mode Request (UMR). In one embodiment, the unrestricted mode request is defined as shown in Table 3. In this embodiment, the UMR includes an unrestricted Reservation Request field (URR) and a field for the requested number of sets above restricted threshold (RNS). For example, URR can have the bit definition: 0001—UMR; all other—Reserved. The RNS can be used to define the required number of additional horizontal sets the Unrestricted Mode device is requesting to be released.

TABLE 3

| UMR | |
|---|---|
| bit7-bit4 | bit 3-bit0 |
| RNS | URR |

Figure 6:
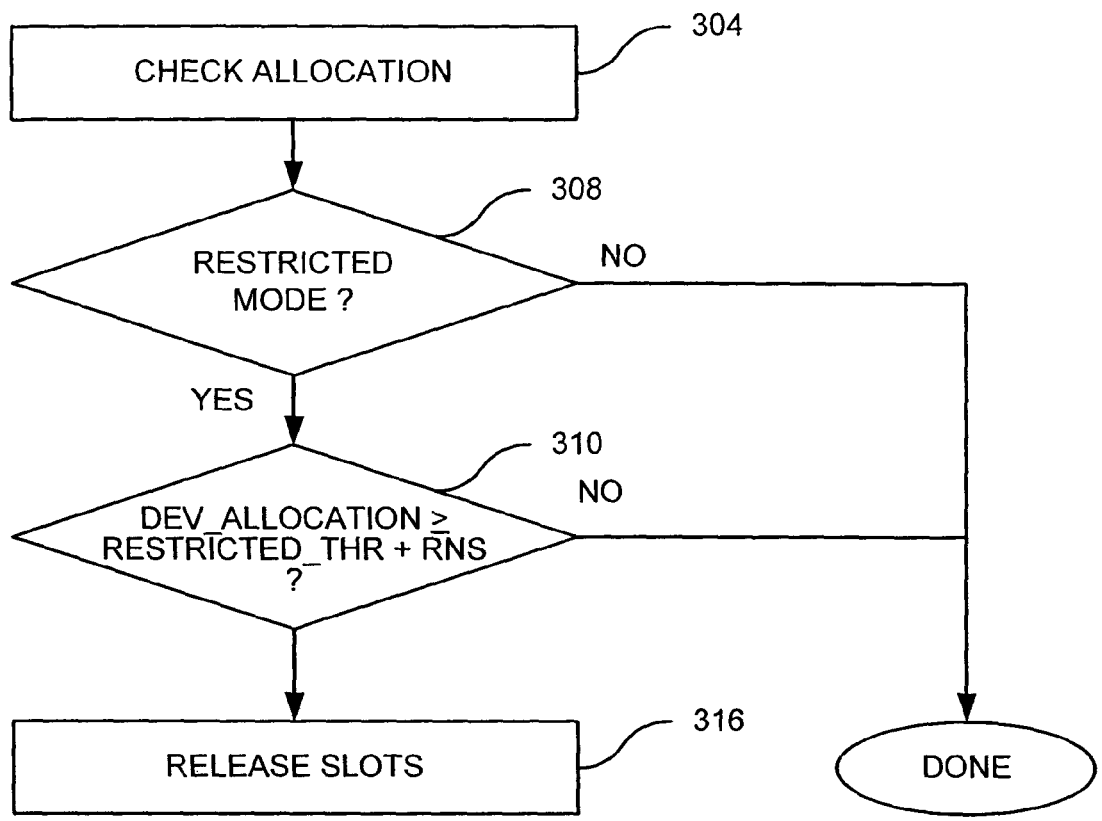
FIG. 6 is an operational flow diagram illustrating one method for bandwidth allocation in accordance with one embodiment of the invention.

Each device can be implemented so as to (or can be required to) check the DRP Allocation field within the beacon period before transmission in the current superframe 104, and the superframe allocation can be adjusted if appropriate. FIG. 6 is an operational flow diagram illustrating an example of this in accordance with one embodiment of the invention. Referring now to FIG. 6, the allocation field is checked to determine whether the device is operating in the restricted or the unrestricted mode. This is illustrated by steps 304 and 308.

If the device is operating in the restricted mode, for a given communication window (e.g., Superframe$_n$) and for a given communication zone (e.g., Zone$_k$), the allocation is checked to determine whether it is requesting slots that would conflict with an unrestricted device's request for additional allocation. In one embodiment this is done by checking to see whether its DEV_ALLOCATION≧RESTRICTED_THR+RNS, and is illustrated by a step 310. If so, in a step 316, the slots up to RESTRICTED_THR+RNS are released by the restricted device for the next communication window (for example, in Superframe$_{n+1}$). Otherwise, operation continues as normal. If the device is operating in the unrestricted mode, in one embodiment it does not need to perform this operation. In this example, preference is given to the delay sensitive devices operating in the restricted mode, and the delay sensitive devices are asked to release only their unused slots, and only when such slots are designated as requested by an unrestricted device. In one embodiment, this can be done on a zone-by-zone basis, wherein the requests for each zone are evaluated.

In one embodiment, however, certain devices, can be given superstatus, where they may be permitted to trump delay sensitive devices and be given slots that would otherwise be used by the delay sensitive devices. This may be desirable, for example, where the power sensitivity of a given device or class of devices is high and the device is critical to the network. Additionally, various devices' status (or status of classes of devices) can be weighted, and the determination of whether to release used or unused slots can be made, at least in part, based on the relative weighting of devices contending for the slots.

There are several ways the restricted zone threshold can be defined in implementing dynamic allocation. For example, one embodiment allows implementation without additional signaling or parameters. In one embodiment, each device may be required to implicitly extract this threshold from the MAS Bitmap field.

In another embodiment, the upper nibble of the ZONE_BITMAP may be allocated to indicate the device zone restricted threshold. One advantage that may be gained by this method is that the threshold may be different in every zone. As such this methodology can offer enhanced flexibility and MAC super-slot utilization.

In yet another embodiment, one or more octets can be allocated to indicate the current restricted threshold for the next communication window. This may be a compromise with the conventional solutions for dynamic allocation. This threshold can be set by last device within the beacon period.

Figure 7:
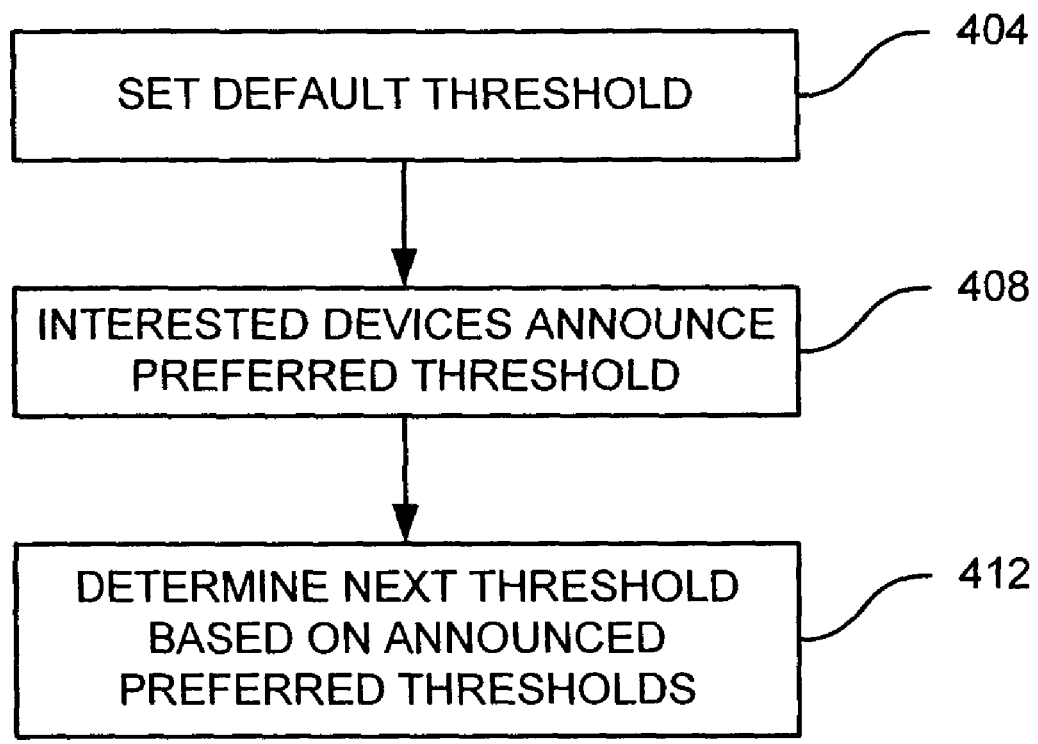
FIG. 7 is an operational flow diagram illustrating one method for bandwidth allocation in accordance with one embodiment of the invention.

In another embodiment of the invention, a methodology can be implemented that considers preferred thresholds of multiple devices when setting the threshold for one or more upcoming communication windows. This can be in such a way as to allow for a dynamic threshold (in some cases, completely dynamic) between restricted and unrestricted areas of the allocation table. FIG. 7 is an operational flow diagram illustrating an example implementation of this method in accordance with one embodiment of the invention.

Referring now to FIG. 7, in a step 404, the current threshold, THRc, can be set to a default value. For example, a default threshold can be set at eight. This is the threshold used in the current communication window. In a step 408, in the beacon period 111, interested devices announce the preferred threshold, THRp, they would like to have in the next communication window (e.g., in the next superframe 104). They can also be requested or required to announce the current value of the threshold, THRc, and the next value of threshold, THRn.

In a step 412, the new threshold can be calculated based on the various requested preferred thresholds (THRp's) of the interested devices. For example, in one embodiment, each device can calculate the next threshold, THRn, to be the greater of the default threshold (eight in the example described) and the smaller of all preferred thresholds in the beacons. This example methodology can be used to ensure a certain level of performance to restricted devices. Other criteria can be used to compute the next threshold. For example, a network designer may determine that power conservation is more critical than delay sensitive device performance, and as such, may select the next threshold to accommodate the maximum requested threshold.

The network devices can then adjust their next threshold, THRn, in their Beacon within mMaxLostBeacons to the newly calculated threshold. Once every device has updated their next threshold, THRn, to the new common threshold, each device can use that threshold in the next superframe as the new current threshold, THRc. (so, THRc and THRn in the beacon will be identical at that point.) The preferred thresholds can be reexamined every superframe, and the next threshold, THRn, adjust as necessary, with a max adjustment delay of mMaxLostBeacon superframes. Certain restrictions may be put on the range of the thresholds THRc/p/n. For example, in one embodiment they may be only in the range of 4-15.

To implement the above, the DRP E frame format can be changed from the format shown in Table 4 to the format shown in Table 5.

TABLE 4

Original DRP IE format

| octets: 1 | 1 | 2 | 2 | 4 | 4 |
|---|---|---|---|---|---|
| Element ID | Length (=4 + 4 × N) | DRP Control | Target/Owner DevAddr | DRP Allocation 1 | ... DRP Allocation N |

TABLE 5

Modified DRP IE format

| octets: 1 | 1 | 2 | 2 | 2 | 4 | 4 |
|---|---|---|---|---|---|---|
| Element ID | Length (=4 + 4 × N) | DRP Control | Target/Owner DevAddr | Allocation Zone Thresholds | DRP Allocation 1 | ... DRP Allocation N |

The Allocation Zone Thresholds field is further defined as shown in Table 6.

TABLE 6

Allocation Zone Thresholds field format

| bits: b15-b12 | b11-b8 | B7-b4 | B3-b0 |
|---|---|---|---|
| Reserved | THRp | THRn | THRc |

In another embodiment of the invention, two types of thresholds are defined to allow flexibility in assigning bandwidth to various devices or classes of devices. For example, in one implementation a hard threshold and a soft threshold are implemented. Preferably, the hard threshold is established and typically would not change. The hard threshold can be set to provide a certain level of guaranteed performance to a class of devices. For example, the hard threshold can be established to ensure that delay sensitive devices have sufficient bandwidth for delay sensitive activities, even if it is at the expense or inconvenience of power sensitive devices. In one embodiment in the example environment, the hard threshold can be established as the conventional boundary between the restricted region 212 and the unrestricted region 214. The unrestricted region up to the hard threshold in one embodiment can be referred to as the hard unrestricted region. In one embodiment, the hard unrestricted region may change from time to time and under certain circumstances as for example occurs with conventional implementations of the WiMedia specification.

The soft threshold can be defined as one that can change based on changing conditions or circumstances of the network and its devices. In one embodiment, network devices can request changes to the soft threshold, and such changes are arbitrated or otherwise decided upon according to various techniques. The unrestricted region beyond hard unrestricted region and up to the soft threshold can be referred to as the soft unrestricted region for purposes of discussion. In one embodiment, vertical allocations up to the soft threshold (even where extending beyond the hard threshold) are allowed, but have lower priority in soft unrestricted region.

As stated above, the soft threshold can change increasing or decreasing the size of the soft unrestricted region, dynamically altering the allocation among devices. For example, in one embodiment delay sensitive devices are given priority and thus if a horizontal allocation is requested by a network device, the soft threshold may be changed to allow more bandwidth for the delay sensitive device(s). Any vertical allocations that may exist or have been requested within the soft unrestricted region can be re-distributed/re-allocated to allow for and adjustment of the soft threshold and to permit the horizontal allocation within what was the soft unrestricted region prior to adjustment. Thus, in this example, bandwidth is reallocated from the unrestricted region to the restricted region.

Additionally, should the demand for a horizontal allocation of bandwidth subsequently decrease such that there is unrequested or unallocated bandwidth in the restricted region, the system can be configured so as to adjust the soft threshold downward, reallocating bandwidth that was previously dedicated to delay-sensitive devices, making that bandwidth available to power-sensitive devices. The adjustment of the soft threshold up and down can be done based on the allocation requirements for a device or class of devices. Certain devices or classes of devices can be given a higher priority or a relative weighting to allow flexibility in determining when and by how much to adjust the soft threshold. For example, in one embodiment the soft threshold can be adjusted based primarily on requirements of delay-sensitive devices. In this example, as delay-sensitive devices require allocations, the soft threshold can be moved so as to increase the bandwidth available in the restricted region, at the expense of the unrestricted region. Thus, vertical allocations in the unrestricted region have a greater likelihood of being broken up or fragmented into smaller pieces across the available bandwidth.

Depending on the goals of the network implementation, certain limitations or restrictions can be placed on the redistribution of the soft threshold. For example, in one embodiment, the redistribution, or reallocation, of bandwidth is implemented only if after redistribution there are a certain number of unallocated media access slots in the hard unrestricted region and soft unrestricted region. For example, in one embodiment, the number of slots required to remain in the unrestricted region can be set to 30 although other allocations are possible. This limitation may be desirable to ensure that there are sufficient allocations remaining in the unrestricted region to allow a certain level of flexibility and network operation. Additionally, it could be required that there be a sufficient number of media access slots remaining for delay-sensitive devices to use after the redistribution of media access slots for power-sensitive devices into the soft unrestricted region.

As yet another example, there can be restrictions placed on the number of communication windows or superframes across which a device can be expected to reallocate its bandwidth. For example, there may be requirements that a device not be required to reallocate its vertical access for a given superframe across multiple superframes. As these examples illustrate, it is contemplated that there be flexibility in allowing a network designer to determine the placement of hard and soft thresholds and the allocation and reallocation of bandwidth based on the movement of one or more of these thresholds as network conditions and priorities may change over time. Thus, it would be apparent to one of ordinary skill in the art after reading this description, how to implement other criteria, conditions and requirements for allocation of bandwidth in accordance with these embodiments.

Additionally, as some of the above examples illustrate, priority or preference may be given to delay-sensitive devices as disruptions in bandwidth for delay-sensitive devices tend to have effects that are noticeable by users or that may be detrimental to the overall goals of the network devices. However, as discussed above, it is contemplated that in alternative embodiments, priority can be given to power-sensitive devices should concerns for the power-sensitivity of these devices outweigh concerns for performance of the delay-sensitive devices. Additionally, there can be other classes or type of devices to which bandwidth is allocated and around which arbitration decisions are made. Of course, within classes of devices there may be subclasses and thus, classes, subclasses and individual devices can be given relative priorities in bandwidth allocation considerations. Thus, for example even where one class of devices typically takes priority over a second class of devices, there may be a device or a subclass of devices in the second class that would trump or take priority over devices in the first class.

A number of mechanisms can be implemented to allow arbitration of the bandwidth between the restricted and unrestricted regions. A few examples of these methodologies are discussed to illustrate the possibilities that can exist for such allocation. For example, in one embodiment, a network device which is implemented so as to request horizontal reservations within the soft unrestricted region even if one or more of the requested media access slots within the soft unrestricted regions are already reserved for or allocated to vertical allocations. This can be done, for example, by requesting the allocation during the beacon period in the example environment or during other like periods in alternative environments. Once such a request for bandwidth in the soft unrestricted region is made, a determination can be made as to whether to reallocate that bandwidth to the devices operating in the unrestricted region. In other words, it can be determined whether to adjust the soft threshold to provide the requested reallocation of bandwidth.

In one embodiment, when such requests are detected by devices having vertical allocations utilizing media access slots in the soft unrestricted region, these devices automatically initiate a redistribution of their allocations to allow for an adjustment of the soft threshold and thus an increase in the restricted region. This typically requires the devices with vertical allocations to chop up these allocations into multiple separate vertical allocations as is illustrated by examples described below. In one embodiment, network devices with the deepest allocations within the soft unrestricted region are requested to initiate the redistribution procedure first. Thus, the redistribution procedure can be done on an iterative basis until the soft threshold is set so as to accommodate the device requesting the horizontal reservations.

As yet another example of the various ways the allocation can be determined, in one embodiment, devices requesting the soft unrestricted region for a horizontal allocation are required to announce the current values of the soft and hard thresholds. This embodiment may be desirable in that it can reduce the complexity for low-latency (horizontal) devices to calculate hard and soft thresholds. These thresholds can be added in the DRP as additional fields to announce in the beacons.

Figure 8:
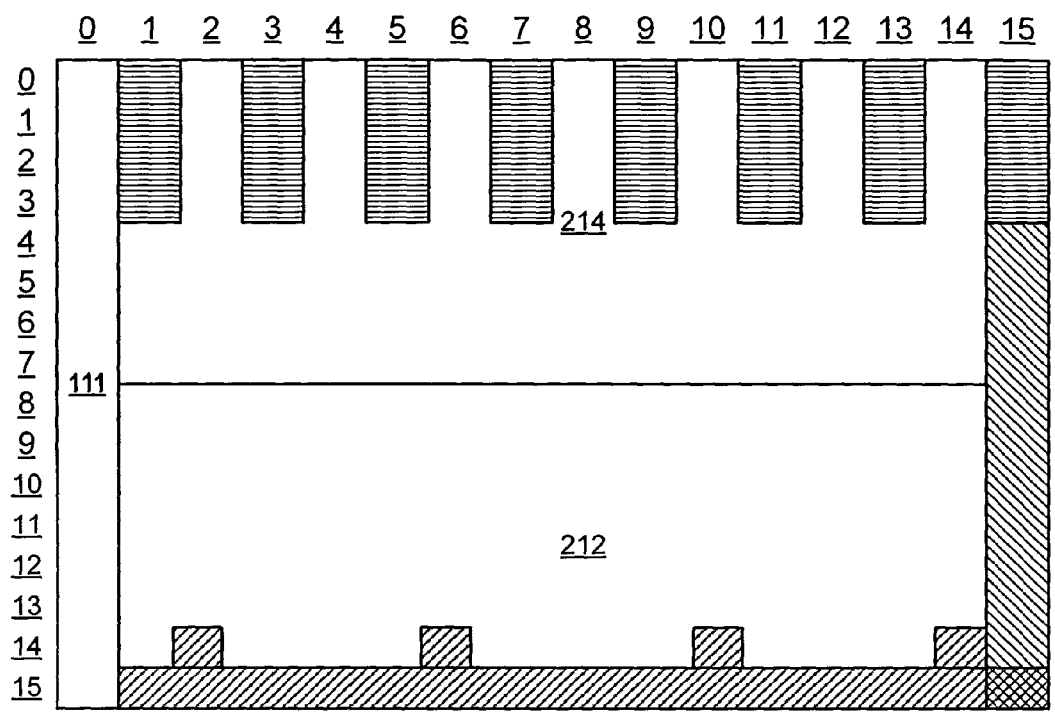
FIG. 8 is diagram illustrating another example allocation of communication activities in an example communication window.

To better illustrate dynamic allocation, a few examples are now described. FIG. 8 is a diagram generally illustrating a portion of network bandwidth, which, in the example environment, can be referred to as a superframe 104. Referring now to FIG. 8, the communication frame includes a beacon 111 and a communication window having a restricted region 212 and an unrestricted region 214. In the illustrated example there are eight PCA set-asides 222, each having a vertical allocation of four media access slots, although this configuration can vary. The example in FIG. 8 also illustrates the hard threshold 240 and soft threshold 242 both being set at a default value of seven (i.e., eight media access slots), evenly splitting restricted region 212 and unrestricted region 214. In this illustration, the soft unrestricted region is zero.

FIG. 8 also illustrates two different classes of devices requesting an allocation of bandwidth within the illustrated communication window. Particularly, the example illustrates a first device (for example, a delay-sensitive device) requesting a horizontal allocation of bandwidth in the restricted region as illustrated by shaded region 224. Additionally, the example illustrates another network device requesting a vertical allocation of 12 media access slots illustrated by shaded region 226. This device, for example, can be a power-sensitive device where it is desirable to allocate its bandwidth in one contiguous block such as to reduce its power-up time enabling conservation of power.

In a scenario where the first device is not requesting bandwidth region 228, there is sufficient room within the communication window to allow the second device to have a 12-slot vertical allocation. Thus, in this scenario, the soft threshold can be changed to 15 (i.e., the hard, unrestricted region and soft unrestricted region comprise 16 media access slots). However, because the first device is requesting a horizontal allocation as illustrated by shaded region 226 and 228, there is a conflict where both devices are requesting access to the same media access slot. This is illustrated by shaded region 228. Because of this conflict, the available bandwidth should be reallocated such as to allow both devices to perform the desired network activities within the given communication window.

As described above, in one embodiment, in one embodiment the device operating in the restricted region requests its bandwidth allocation as illustrated in FIG. 8 by shaded region 224 and this allocation that it requests also includes shaded region 228. Further following the example set forth above, because the second device is now aware of the conflict and because it is utilizing bandwidth within the soft unrestricted region, the second device begins a redistribution of its slots such that the first device can be given its horizontal allocation as requested. Of course, as would be apparent to one of ordinary skill in the art after reading this description, the priority could be set otherwise.

Figure 9:
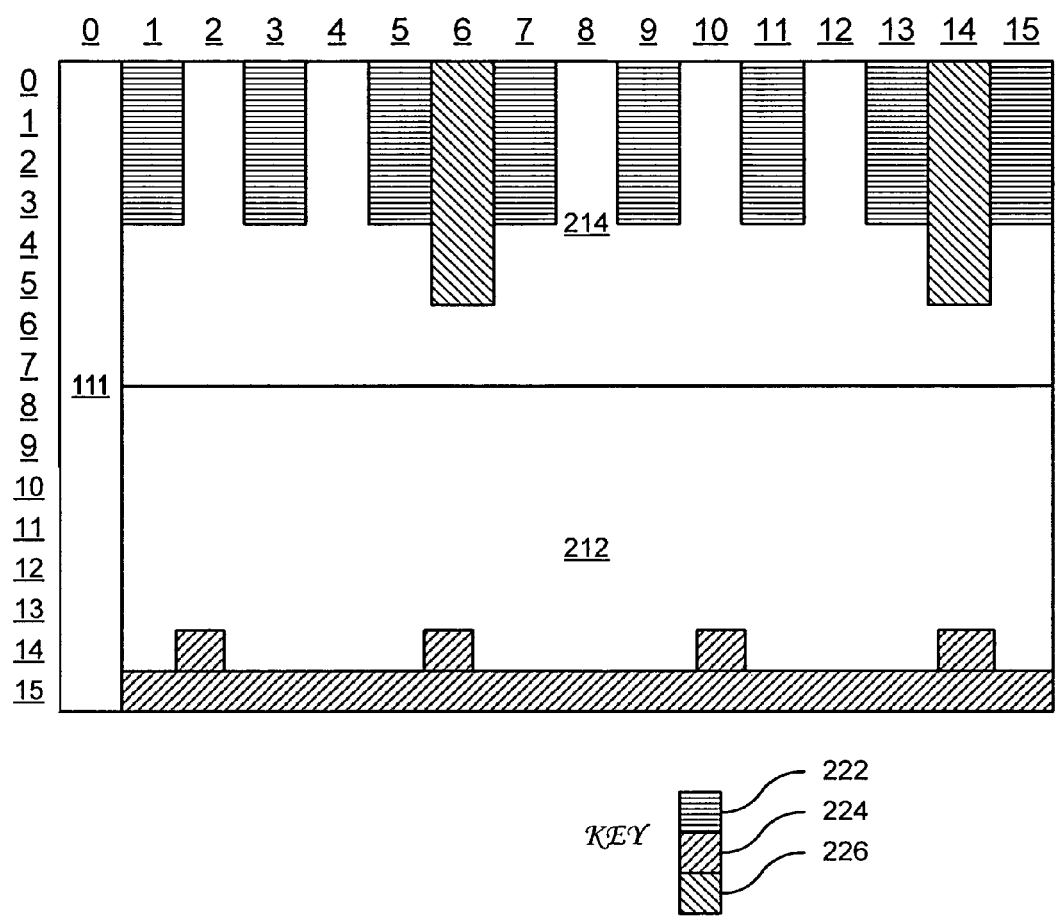
FIG. 9 is diagram illustrating another example allocation of communication activities in an example communication window.

One option for redistribution of the vertical allocation is illustrated in FIG. 9, although other reallocations are possible. In the illustrated option, the second device reallocates its bandwidth to zones 06 and 14 wherein each zone has a vertical allocation of six media access slots. These are illustrated by shaded portions 226 in FIG. 9. As a result of this reallocation, there is no longer a conflict between the first and second device and both devices are given their desired bandwidth allocation. In this example, however, the device operating in the restricted region was given priority and is allowed to conduct its network activities are requested at the expense of the device operating in the unrestricted region 214. Thus, in this example, the unrestricted device would now be required to conduct its network activities in two separate timeframes, potentially requiring awakening from a power-save mode and additional time. In one embodiment, the reallocation of bandwidth can be made such that the reallocated bandwidth pieces are close in time so as to reduce the wake-up time required for a power-sensitive device.

Figure 10:
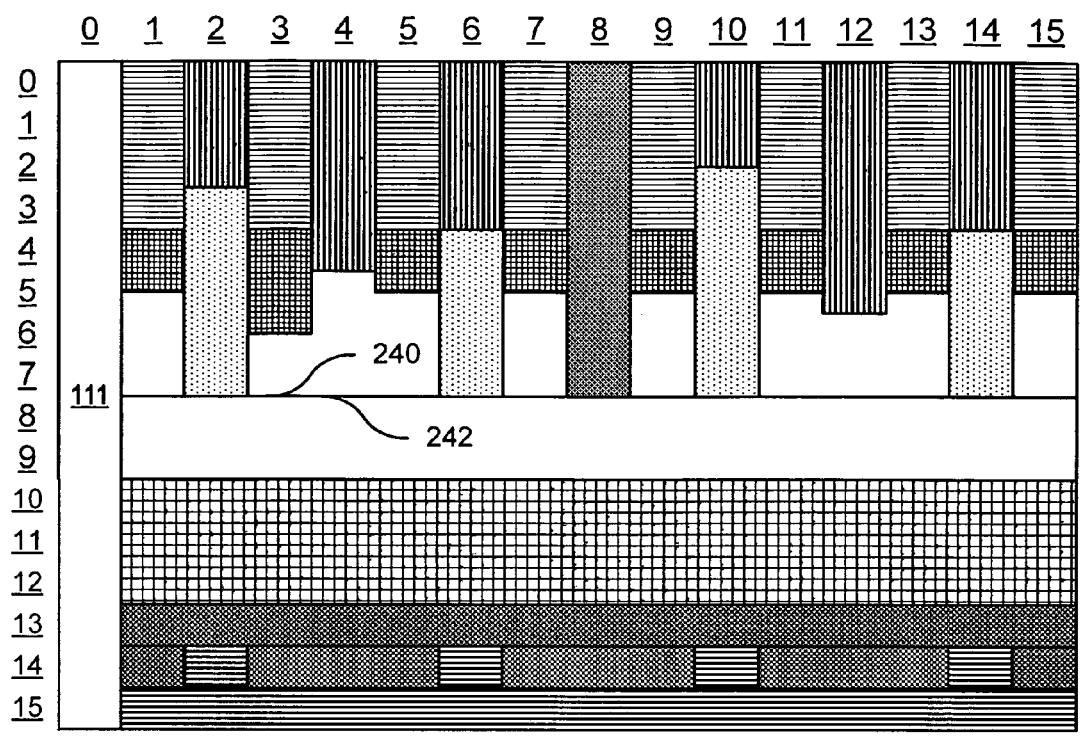
FIG. 10 is diagram illustrating another example allocation of communication activities in an example communication window.
Figure 11:
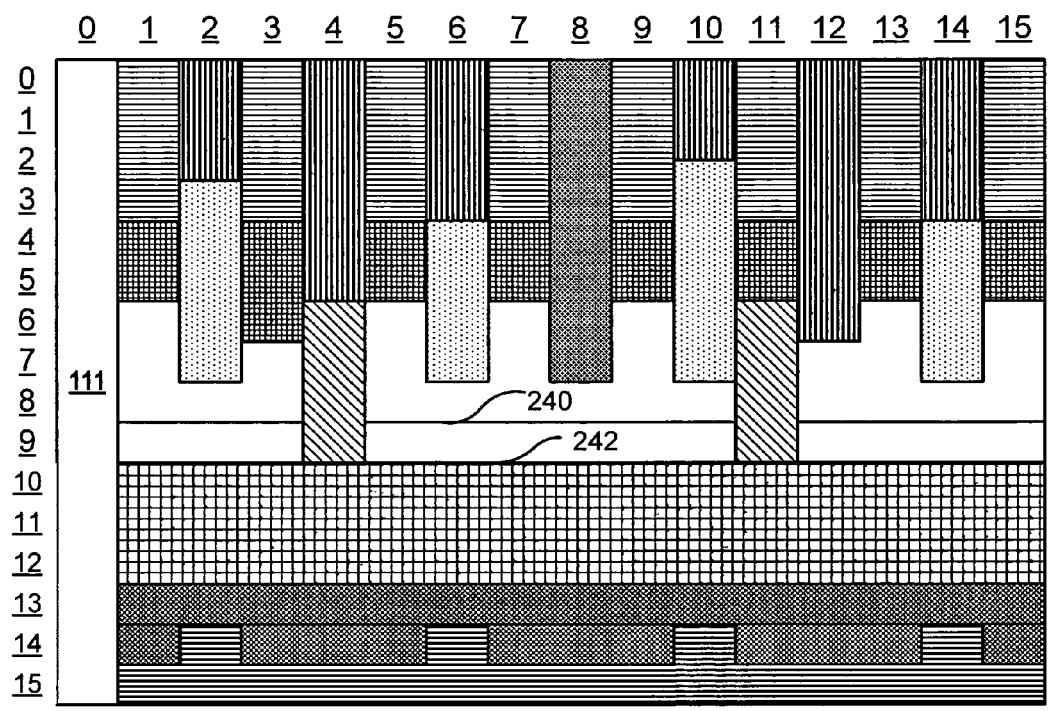
FIG. 11 is diagram illustrating another example allocation of communication activities in an example communication window.
Figure 11:
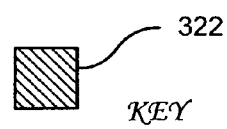

To further illustrate the redistribution of the soft threshold, consider a more congested scenario where several network devices are operating within both the restricted and unrestricted regions. Such an example scenario is illustrated in FIG. 10, although other scenarios are certainly possible. For the purpose of discussion, consider that the hard and soft thresholds are initially set at the same level, equally dividing the unrestricted and restricted regions. Now consider an example scenario wherein a new device requires a vertical allocation of eight media access slots as illustrated by shaded regions 322 in FIG. 11. Based on the network utilization, it is determined that these eight slots can be allocated in two zones and to accommodate this the soft threshold 242 can be moved such that the soft unrestricted region is two slots deep as illustrated in FIG. 11. As a result of this reallocation, the new unrestricted region encompassing the hard unrestricted region and the soft unrestricted region is now 10 slots deep, the requesting device is provided its allocation of eight vertical slots in two zones, and the devices utilizing the horizontal allocation in the restricted region are not impacted by this change.

Figure 12:
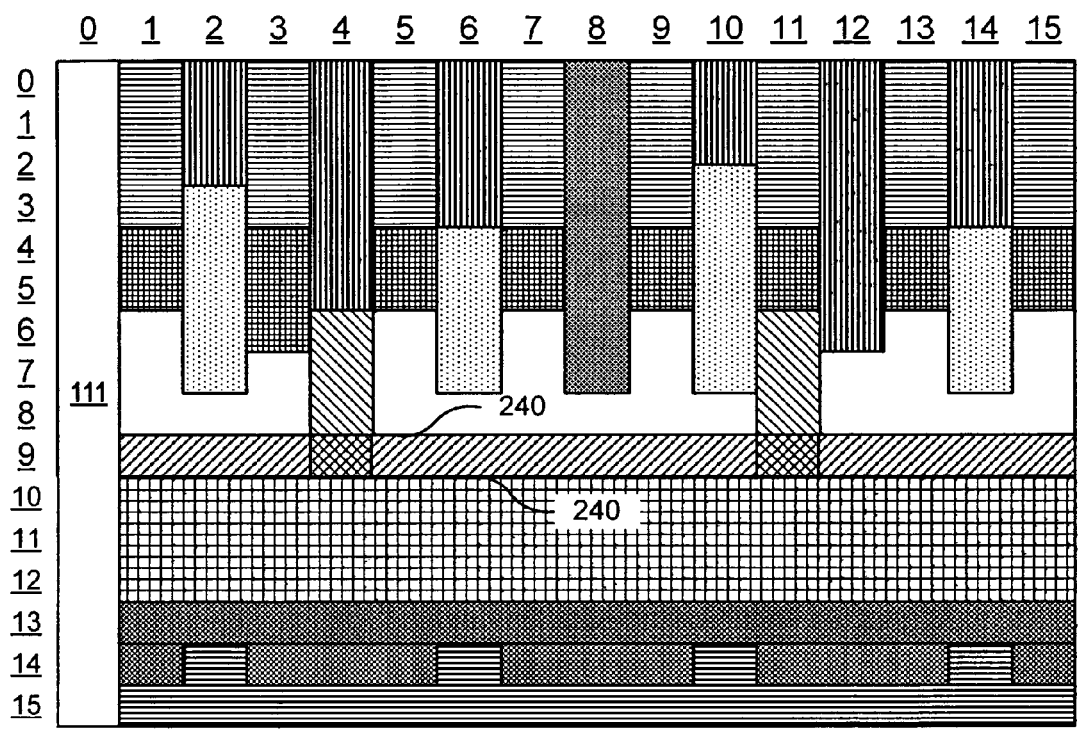
FIG. 12 is diagram illustrating another example allocation of communication activities in an example communication window.

Continuing with the example illustrated FIG. 11, further consider that a second network device operating in the restricted region requests a horizontal allocation of 15 media access slots. As illustrated in FIG. 12, based on the current communication loading, these horizontal access slots would occupy row 9 as illustrated by shaded region 334 (and including shaded region 336). As illustrated, by shaded region 336, the reservation request conflicts with the first device operating in the vertical mode. In an example where the horizontal mode has priority, the first device recognizes the conflict with its current utilization of the soft unrestricted region, and sets out to reallocate its current utilization of bandwidth. This reallocation can take place in a number of different ways based on network availability and one such example is illustrated in FIG. 13. Referring to FIG. 13, as this example illustrates, the soft threshold 242 is once again coincident with hard threshold 240 and the vertical allocations of the first device illustrated by shaded regions 322 are now split into three zones, thus allowing the second device its uninterrupted horizontal allocation as illustrated by shaded region 324.

Figure 14:
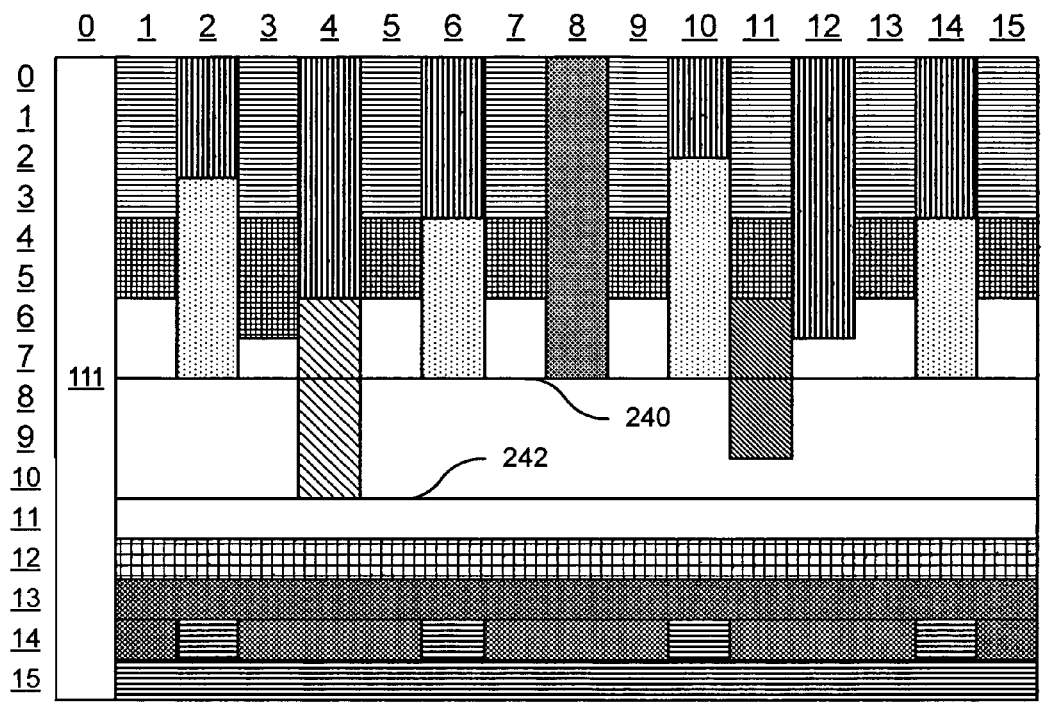
FIG. 14 is diagram illustrating another example allocation of communication activities in an example communication window.
Figure 14:
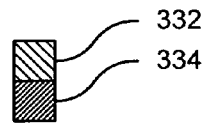

As another example, consider the possible scenario illustrated in FIG. 14, wherein two independent vertical allocations illustrated by shaded regions 332, 334 are utilizing the soft unrestricted region, and the soft threshold 242 is set at 10. Now consider an example where a third device needs an allocation of 31 slots as illustrated in FIG. 15 as shaded region 336 (including shaded region 338). As this example illustrates, shaded region 338 is at conflict. In an example scenario where the device operating in the horizontal allocation would have priority, the first device operating in shaded region 332 would move its allocation and the soft threshold 242 would be adjusted after the reallocation. In one example, the table may appear as the example illustrated in FIG. 16, with the allocation of the first device split into two zones 332 and the soft threshold adjusted accordingly.

Figure 16:
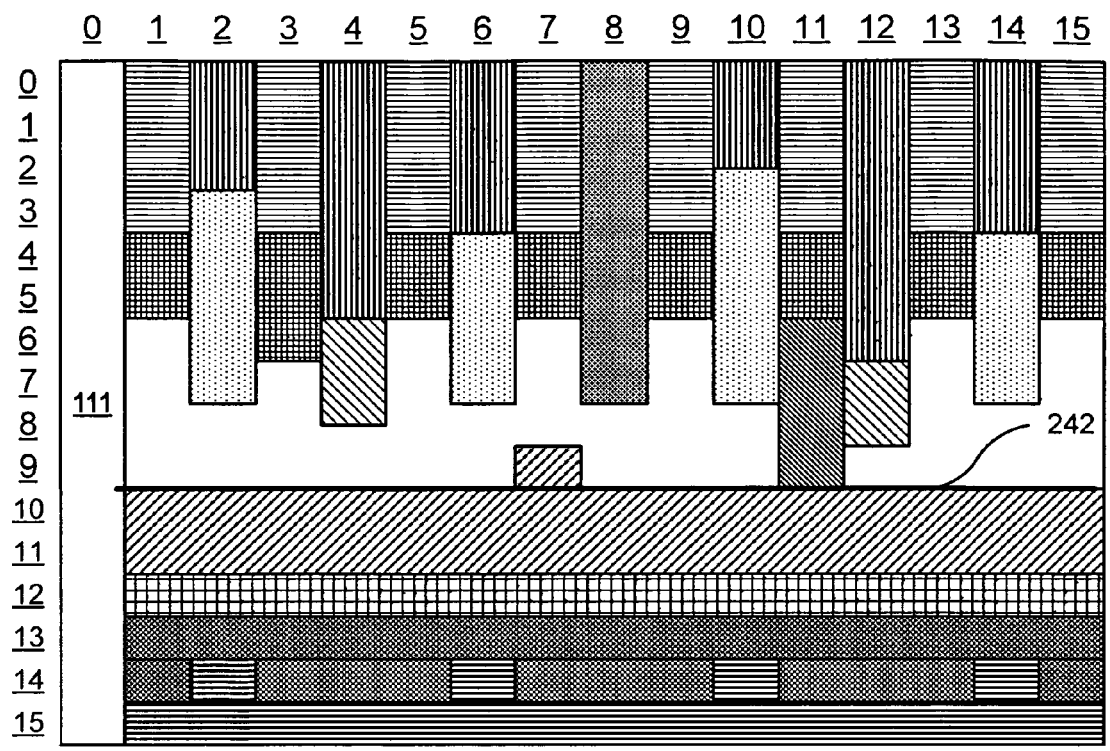
FIG. 16 is diagram illustrating another example allocation of communication activities in an example communication window.
Figure 16:
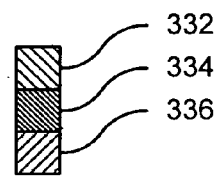

Note that in one embodiment, the soft threshold 242 does not need to be adjusted to ensure that none of the horizontal allocations are made in the soft unrestricted region. As the example illustrated in FIG. 16 depicts, there is a vertical allocation 334 extending into the soft unrestricted region as well as the horizontal allocation 336, extending into the soft allocation region. However, because these do not conflict, in one embodiment, the soft unrestricted region is allowed to remain as allocated such that the vertical allocation 334 does not need to be unnecessarily reallocated.

In yet another embodiment of the invention, the system can be implemented with the capability to calculate transmitter and receiver thresholds, including, for example, hard and soft thresholds. Because a network device may have different communication requirements relative to the various other network devices, thresholds for a receiver may be calculated from each of the receiver's and transmitter's own point of view of the network, which could be different from one another. Thus, in one embodiment, each of the receiver and the transmitter can be configured to determine, for example, the amount by which a given reservation or group of reservations exceeds a given threshold. In one embodiment, each of the receiver and the transmitter can be requested to announce their thresholds during a setup period such as, for example, the beacon period in the example environment. Thus, as a result of these announcements, other devices operating in the network know the status and requirements of the given receiver and transmitter.

In one embodiment, a network device having a proper level of priority, can utilize these numbers to preempt another device where appropriate. For example, in a network where horizontal allocations have priority over vertical allocations, a network device communicating with horizontal allocations can look at vertical allocations of another device and determine whether a conflict exists and, if so, preempt the other device from one or more slots in conflict. As illustrated above, the preemption can take the form of adjusting the soft threshold such as to decrease the soft unrestricted region thereby requiring all devices having a vertical allocation to remain within the reallocated boundaries. In other embodiments, the preemption can merely require that the offending device reallocate its requested bandwidth in a manner that does not conflict with other devices or other higher priority devices. Although it may be desirable for the preempted develop to reallocate its bandwidth in the current communication window (for example, superframe 104 in the example environment), such a constraint is not always a requirement. Indeed, a preempted device may be permitted to or may be forced to reallocate a portion of its desired network activities to subsequent communication windows. As would be apparent to one of ordinary skill in the art after reading this description, a number of different preemption mechanisms can be implemented to achieve the desired goals.

While various embodiments of the present invention have been described above, it should be understood that they have been presented by way of example only, and not of limitation. Thus the breadth and scope of the present invention should not be limited by any of the above-described exemplary embodiments, but should be defined only in accordance with the following claims and their equivalents. Additionally, the invention is described above in terms of various exemplary embodiments and implementations. It should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives like "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise.

What is claimed is:

1. A method of medium access on a distributed communications network, wherein communication activities on the distributed communications network take place during communications windows, wherein a given communications window comprises a plurality of timeslots and a scheduling window that comprises a subset of the plurality of timeslots, the method comprising:
   a network device transmitting a beacon to other network devices on the distributed communications network during a first scheduling window of a first communications window, wherein the beacon comprises a reservation of timeslots during a second communications window, and wherein the beacon further comprises an indication of whether the reservation of timeslots conforms with a predetermined timeslot reservation protocol shared among the network devices on the distributed communications network; and
   the network device modifying its reservation of timeslots such that its reservation does not conflict with the other network device's reservation when the beacon indicates that the reservation of timeslots does not conform with the predetermined timeslot reservation protocol and the network device receives a preemption request from another network device on the distributed communications network indicating that the network device's reservation conflicts with the other network device's reservation of timeslots during the second communications window;
   wherein the plurality of timeslots of the given communications window are arranged into a plurality of groups of contiguous timeslots, each group of the plurality having an equal number of timeslots; wherein the predetermined timeslot reservation protocol allows network devices to make horizontal reservations and vertical reservations, a horizontal reservation comprising a reservation of a timeslot at a specific slot location from each group of contiguous timeslots of the plurality of groups, and a vertical reservation comprising a reservation of a plurality of contiguous timeslots within a group of contiguous timeslots of the plurality of contiguous timeslots;
   wherein the predetermined timeslot reservation protocol maintains a portion of the plurality of timeslots for horizontal reservations; and
   wherein the reservation of timeslots that does not conform with the predetermined timeslot reservation protocol comprises a vertical reservation within the portion of the plurality of timeslots for horizontal reservations.

2. The method of claim 1, wherein the step of the network device modifying its reservation of timeslots comprises the network device conforming to the predetermined timeslot reservation protocol.

3. The method of claim 2, wherein the step of the network device modifying its reservation of timeslots takes place a predetermined number of communications windows after receiving the preemption request.

4. The method of claim 1, wherein the step of the network device modifying its reservation of timeslots takes place a predetermined number of communications windows after receiving the preemption request.

5. The method of claim 1, further comprising imposing a penalty on the network device for not conforming to the predetermined timeslot reservation protocol.

6. The method of claim 5, wherein the penalty imposed on the network device for deviating from the utilization policy comprises at least one of an extra monitoring task, extra reporting effort, and a limitation in bandwidth utilization.

7. The method of claim 5, wherein the penalty imposed on the network device is self-imposed.

8. The method of claim 5, wherein the penalty imposed is the refusal of a reward otherwise granted for conforming to a reallocation request.

9. The method of claim 5, wherein the penalty imposed is dynamically selected based on current network status.

10. The method of claim 5, wherein the penalty imposed is determined based on at least one of the magnitude of the deviation from the predetermined timeslot reservation, the frequency of deviation by the network device, the number of times the network device has deviated from the predetermined timeslot reservation, and the status of the distributed communications network.

11. A network device configured to operate within a distributed communication network, wherein communication activities on the distributed communications network take place during communications windows, wherein a given communications window comprises a plurality of timeslots and a scheduling window that comprises a subset of the plurality of timeslots, the network device comprising:
   a housing;
   at least one of a transmitter and receiver in the housing;
   control logic, comprising hardware or computer executable program code embodied on a non-transitory storage medium, within the housing and configured to perform the steps of:
   transmitting a beacon to other network devices on the distributed communications network during a first scheduling window of a first communications window, wherein the beacon comprises a reservation of timeslots during a second communications window, and wherein the beacon further comprises an indication of whether the reservation of timeslots conforms with a predetermined timeslot reservation protocol shared among the network devices on the distributed communications network; and
   the network device modifying its reservation of timeslots such that its reservation does not conflict with the other network device's reservation when the beacon indicates that the reservation of timeslots does not conform with the predetermined timeslot reservation protocol and the network device receives a preemption request from another network device on the distributed communications network indicating that the network device's reservation conflicts with the other network device's reservation of timeslots during the second communications window, modifying the network device's own reservation of timeslots such that its reservation does not conflict with the other network device's reservation;
wherein the plurality of timeslots of the given communications window are arranged into a plurality of groups of contiguous timeslots, each group of the plurality having an equal number of timeslots; wherein the predetermined timeslot reservation protocol allows network devices to make horizontal reservations and vertical reservations, a horizontal reservation comprising a reservation of a timeslot at a specific slot location from each group of contiguous timeslots of the plurality of groups, and a vertical reservation comprising a reservation of a plurality of contiguous timeslots within a group of contiguous timeslots of the plurality of contiguous timeslots;
wherein the predetermined timeslot reservation protocol maintains a portion of the plurality of timeslots for horizontal reservations; and
wherein the reservation of timeslots that does not conform with the predetermined timeslot reservation protocol comprises a vertical reservation within the portion of the plurality of timeslots for horizontal reservations.

12. The network device of claim 11, wherein the step of the network device modifying its reservation of timeslots comprises the network device conforming to the predetermined timeslot reservation protocol.

13. The network device of claim 12, wherein the step of the network device modifying its reservation of timeslots takes place a predetermined number of communications windows after receiving the preemption request.

14. The network device of claim 11, wherein the step of the network device modifying its reservation of timeslots takes place a predetermined number of communications windows after receiving the preemption request.

15. The network device of claim 11, wherein the control logic is further configured such that a penalty is imposed on the network device for not conforming to the predetermined timeslot reservation protocol.

16. The network device of claim 15, wherein the penalty imposed on the network device for deviating from the predetermined timeslot reservation protocol comprises at least one of an extra monitoring task, extra reporting effort, and a limitation in bandwidth utilization.

17. The network device of claim 15, wherein the penalty imposed on the network device is self-imposed.

18. The network device of claim 15, wherein the penalty imposed is the refusal of a reward otherwise granted for conforming to a reallocation request.

19. The network device of claim 15, wherein the penalty imposed is dynamically selected based on current network status.

20. The network device of claim 15, wherein the penalty imposed is determined based on at least one of the magnitude of the deviation from the predetermined timeslot reservation protocol, the frequency of deviation by the network device, the number of times the network device has deviated from the predetermined timeslot reservation protocol, and the status of the distributed communication network.

21. A non-transitory storage medium having executable program code embodied thereon, the executable program code configured to cause a network device to perform a medium access method on a distributed communications network, wherein communication activities on the distributed communications network take place during communications windows, wherein a given communications window comprises a plurality of timeslots and a scheduling window that comprises a subset of the plurality of timeslots, the method comprising:
a network device transmitting a beacon to other network devices on the distributed communications network during a first scheduling window of a first communications window, wherein the beacon comprises a reservation of timeslots during a second communications window, and wherein the beacon further comprises an indication of whether the reservation of timeslots conforms with a predetermined timeslot reservation protocol shared among the network devices on the distributed communications network; and
the network device modifying its reservation of timeslots such that its reservation does not conflict with the other network device's reservation when the beacon indicates that the reservation of timeslots does not conform with the predetermined timeslot reservation protocol and the network device receives a preemption request from another network device on the distributed communications network indicating that the network device's reservation conflicts with the other network device's reservation of timeslots during the second communications window;
wherein the plurality of timeslots of the given communications window are arranged into a plurality of groups of contiguous timeslots, each group of the plurality having an equal number of timeslots; wherein the predetermined timeslot reservation protocol allows network devices to make horizontal reservations and vertical reservations, a horizontal reservation comprising a reservation of a timeslot at a specific slot location from each group of contiguous timeslots of the plurality of groups, and a vertical reservation comprising a reservation of a plurality of contiguous timeslots within a group of contiguous timeslots of the plurality of contiguous timeslots;
wherein the predetermined timeslot reservation protocol maintains a portion of the plurality of timeslots for horizontal reservations; and
wherein the reservation of timeslots that does not conform with the predetermined timeslot reservation protocol comprises a vertical reservation within the portion of the plurality of timeslots for horizontal reservations.

22. The non-transitory storage medium of claim 21, wherein the step of the network device modifying its reservation of timeslots comprises the network device conforming to the predetermined timeslot reservation protocol.

23. The non-transitory storage medium of claim 21, wherein the step of the network device modifying its reservation of timeslots takes place a predetermined number of communications windows after receiving the preemption request.

24. The non-transitory storage medium of claim 22, wherein the step of the network device modifying its reservation of timeslots takes place a predetermined number of communications windows after receiving the preemption request.

25. The non-transitory storage medium of claim 21, wherein the medium access method further comprises imposing a penalty on the network device for not conforming to the predetermined timeslot reservation protocol.

26. The non-transitory storage medium of claim 25, wherein medium access method further comprises modifying the scheduling of communication activities when the scheduled activities deviate from the predetermined timeslot reservation protocol and the network is operating outside of predetermined levels for a condition of the network.

27. The non-transitory storage medium of claim 25, wherein the penalty imposed on the network device for deviating from the predetermined timeslot reservation protocol comprises at least one of an extra monitoring task, extra reporting effort, reallocation of the network device's scheduled allocations and a limitation in bandwidth utilization.

28. The non-transitory storage medium of claim 25, wherein the penalty imposed is the refusal of a reward otherwise granted for conforming to a reallocation request.

29. The non-transitory storage medium of claim 25, wherein the penalty imposed is dynamically selected based on current network status.

30. The non-transitory storage medium of claim 25, wherein the penalty imposed is determined based on at least one of the magnitude of the deviation from the predetermined timeslot reservation protocol, the frequency of deviation by the network device, the number of times the network device has deviated from the predetermined timeslot reservation protocol, and the status of the distributed communication network.

* * * * *